March 11, 1941.	F. L. FULLER ET AL	2,234,241
TABULATING MACHINE
Filed Nov. 5, 1936	20 Sheets-Sheet 8

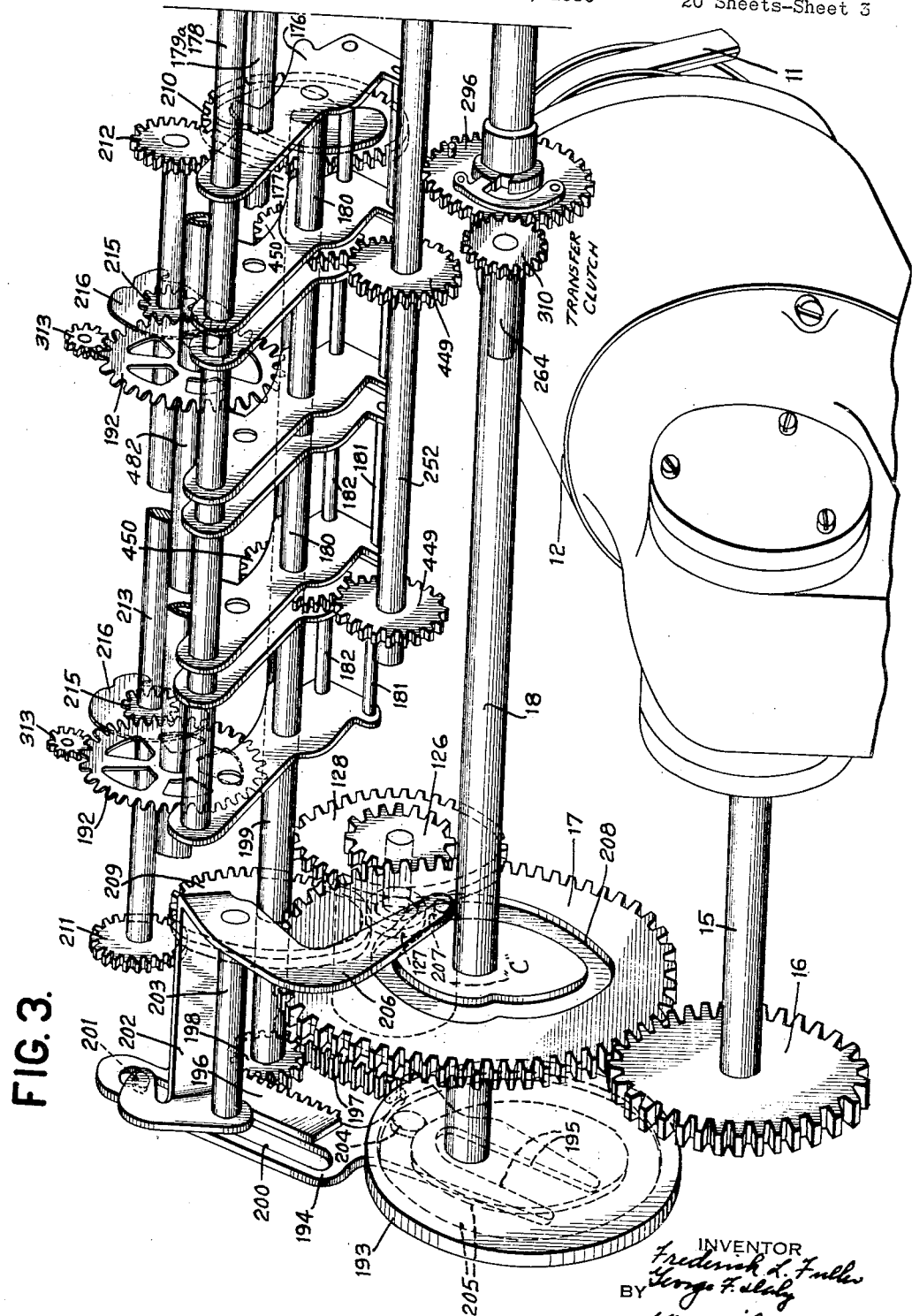

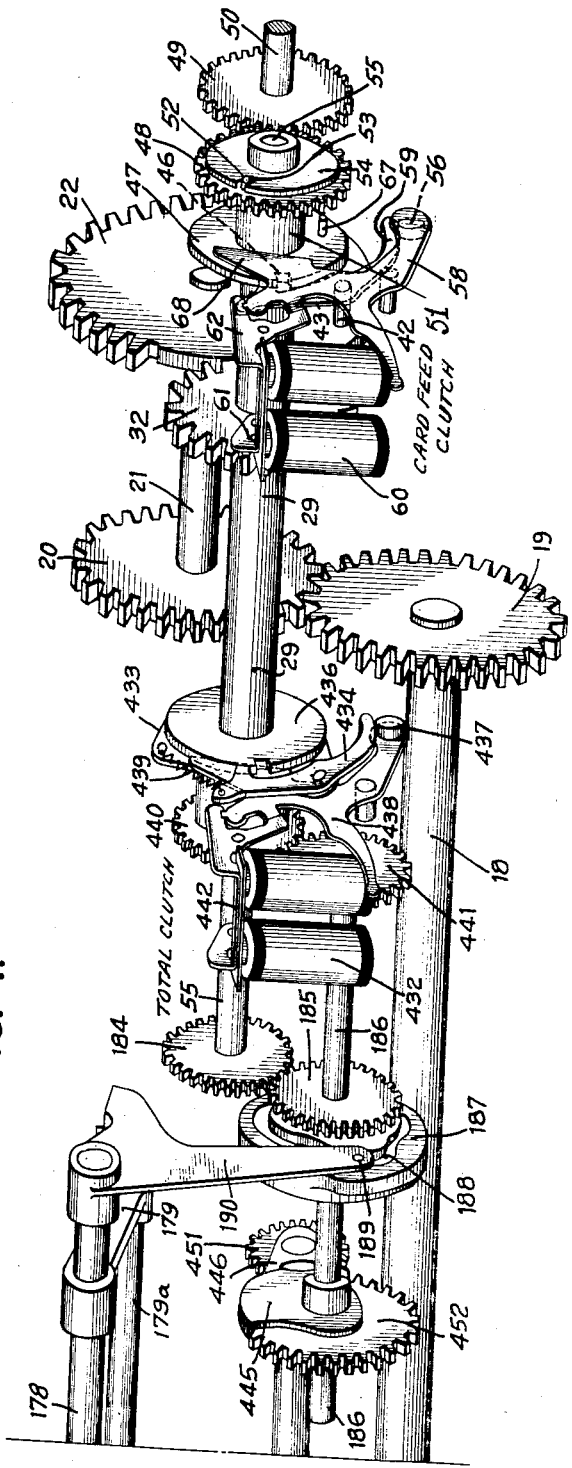

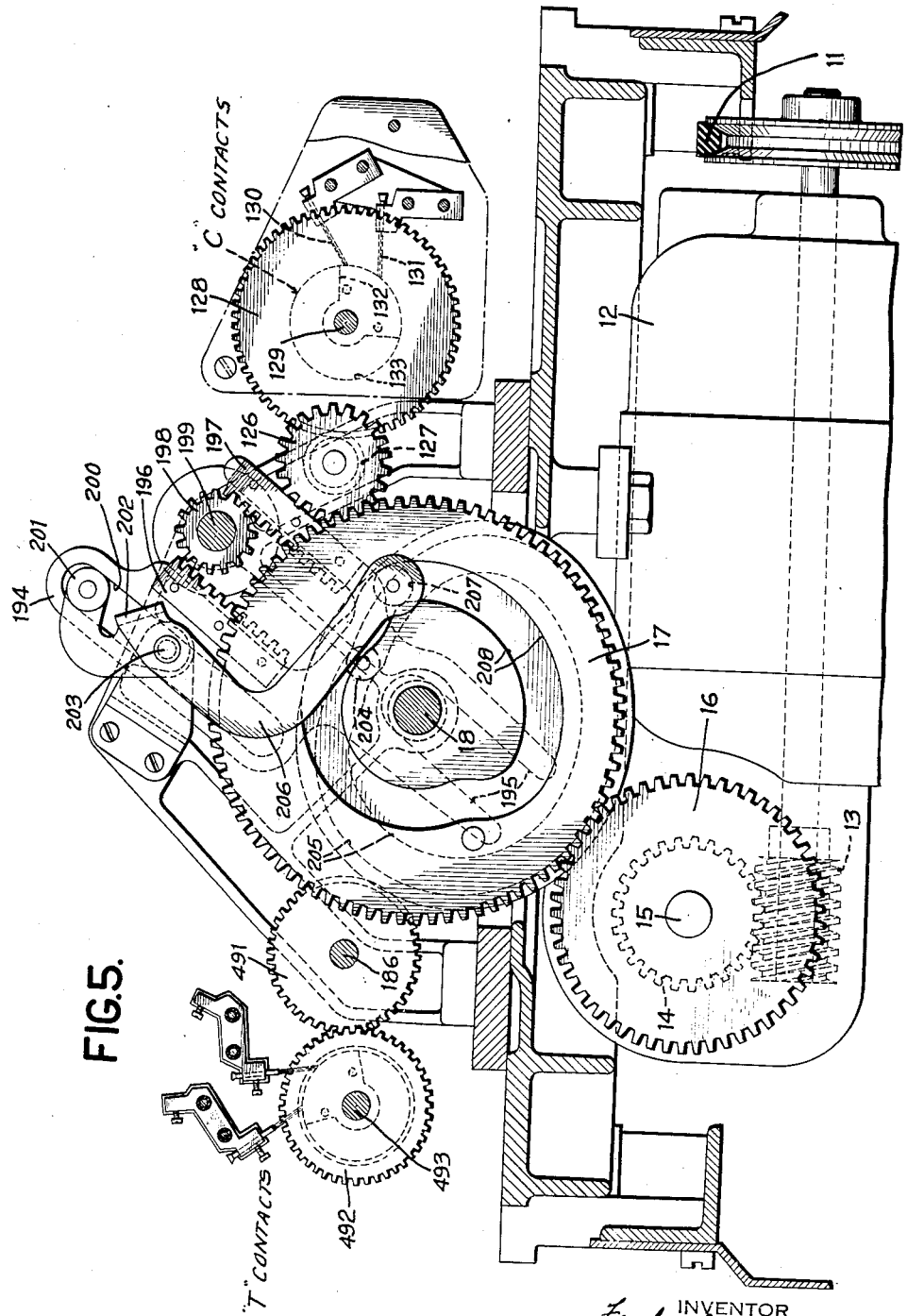

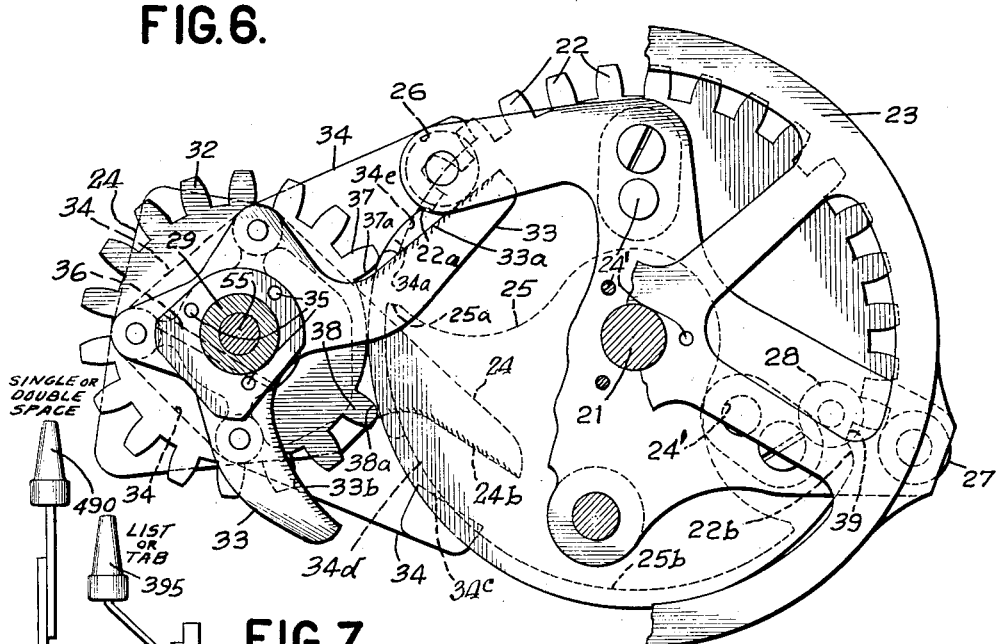
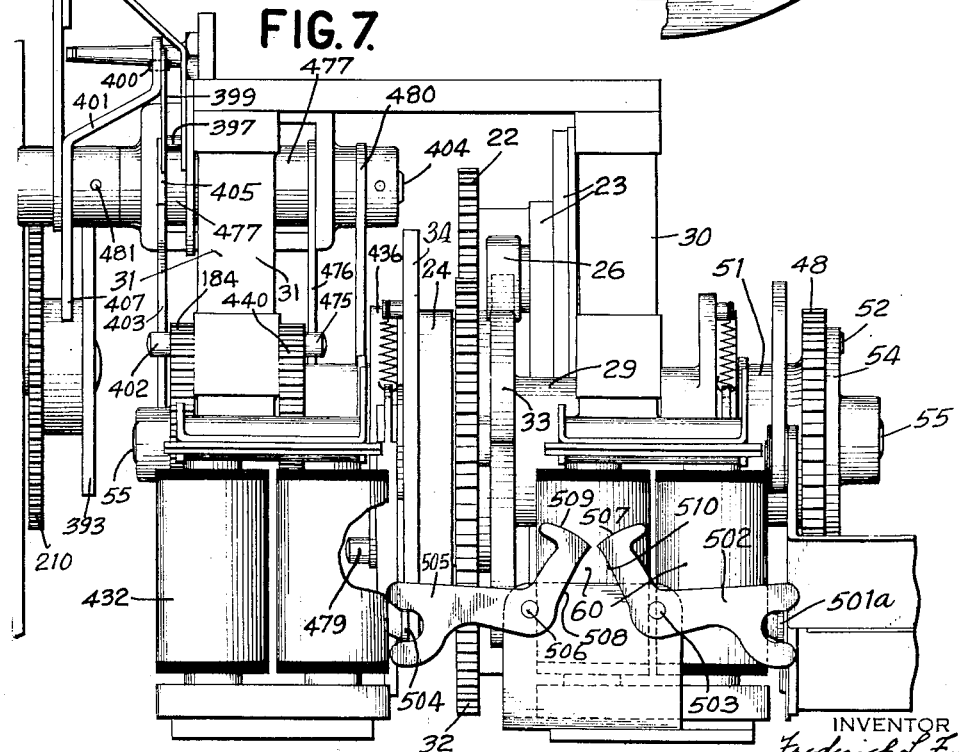

INVENTOR
Frederick L. Fuller
George F. Daly
BY
ATTORNEY

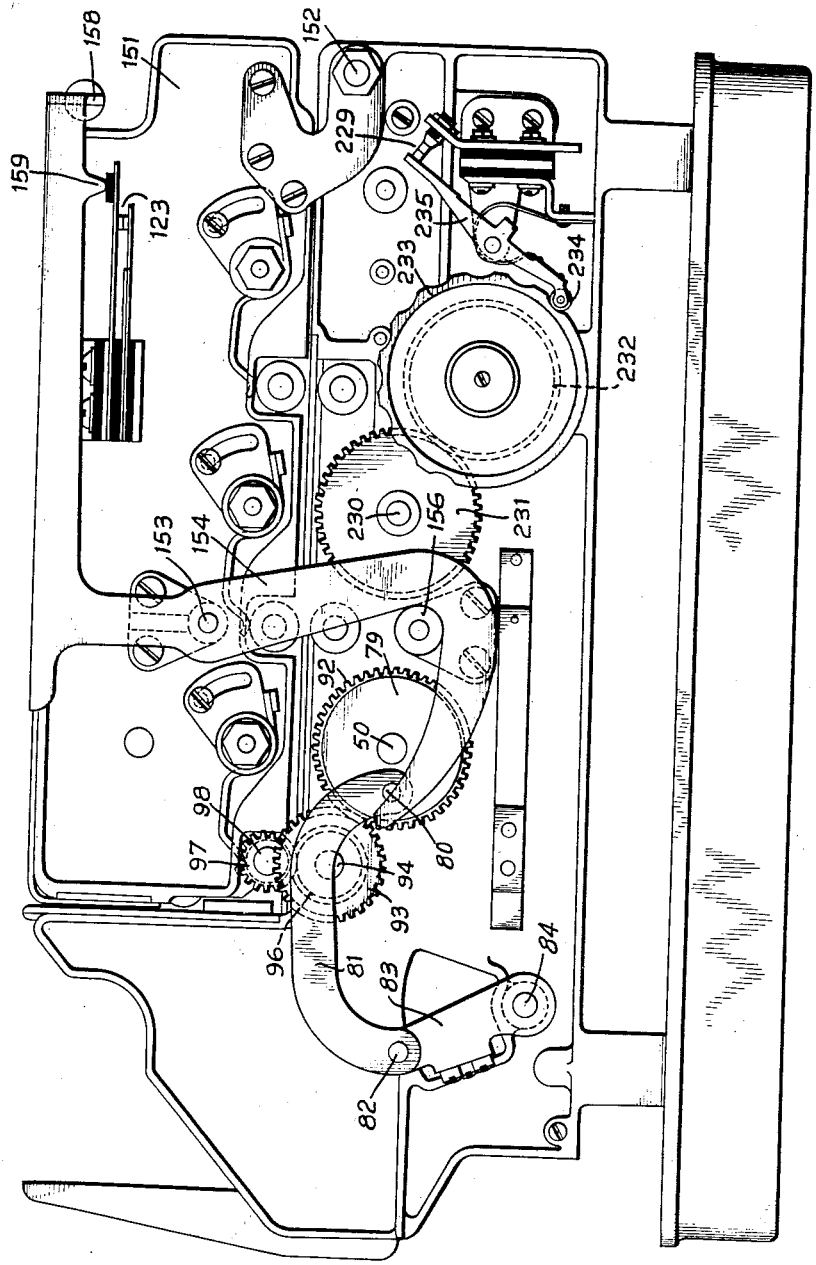

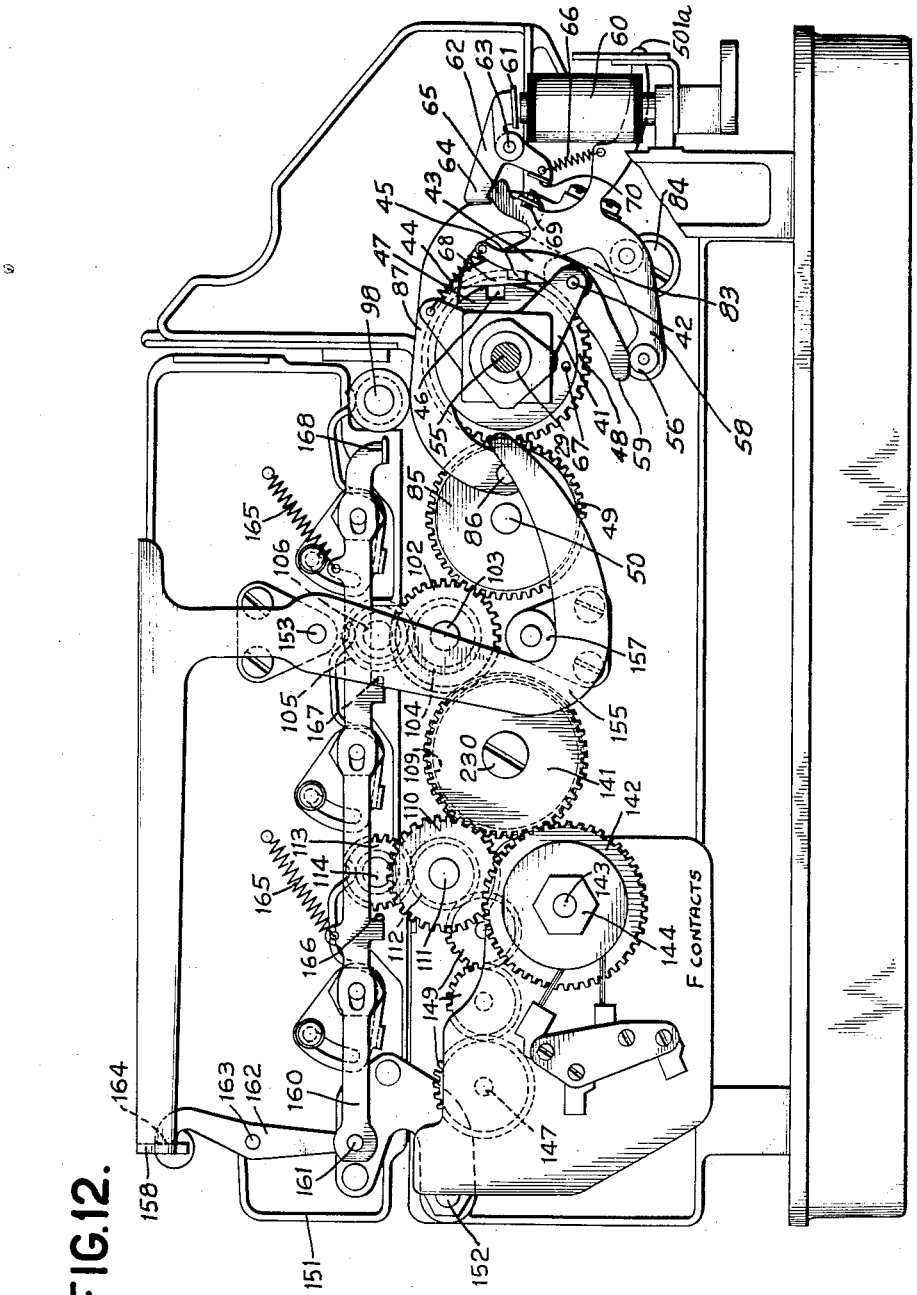

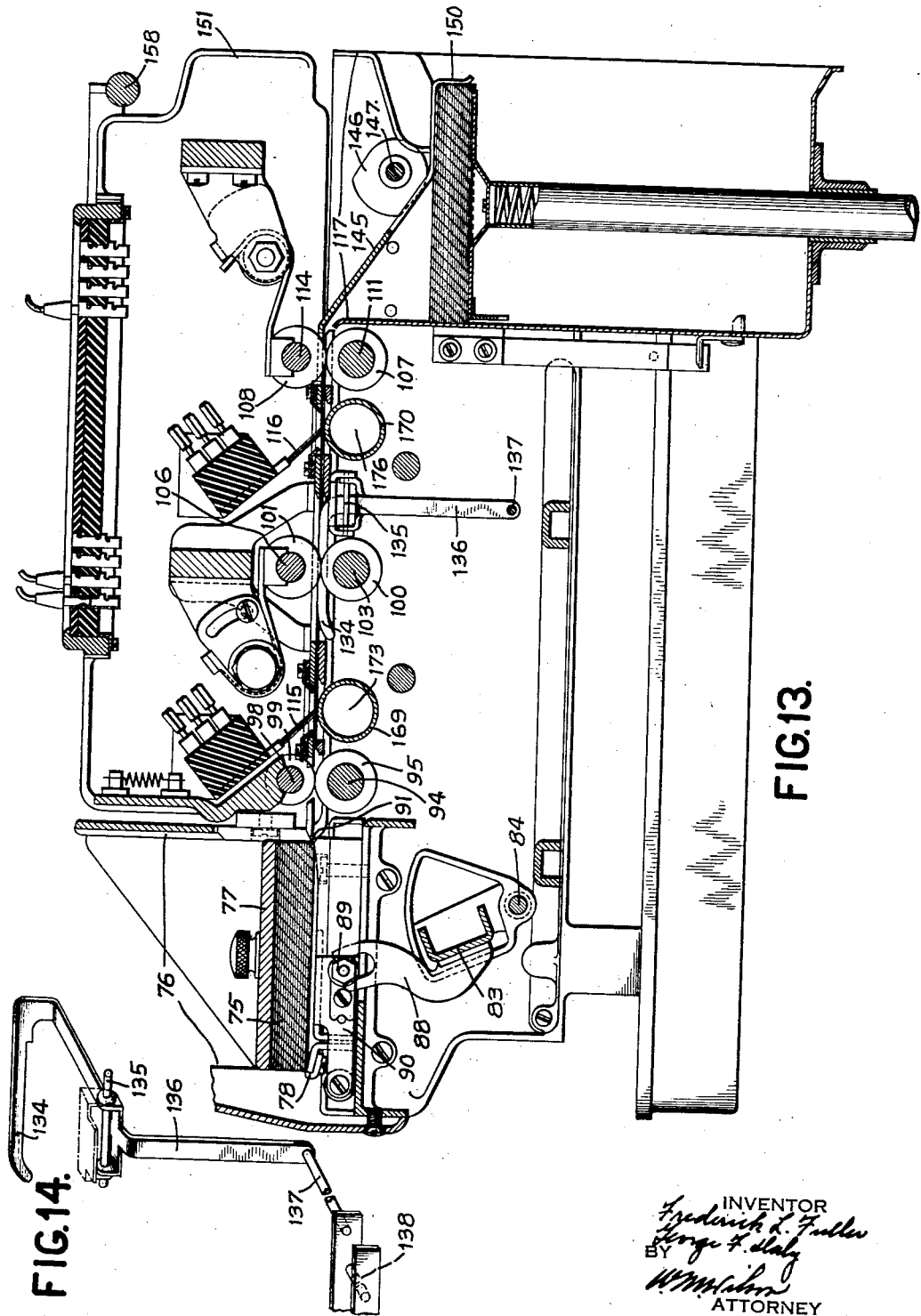

March 11, 1941.   F. L. FULLER ET AL   2,234,241
TABULATING MACHINE
Filed Nov. 5, 1936   20 Sheets-Sheet 12

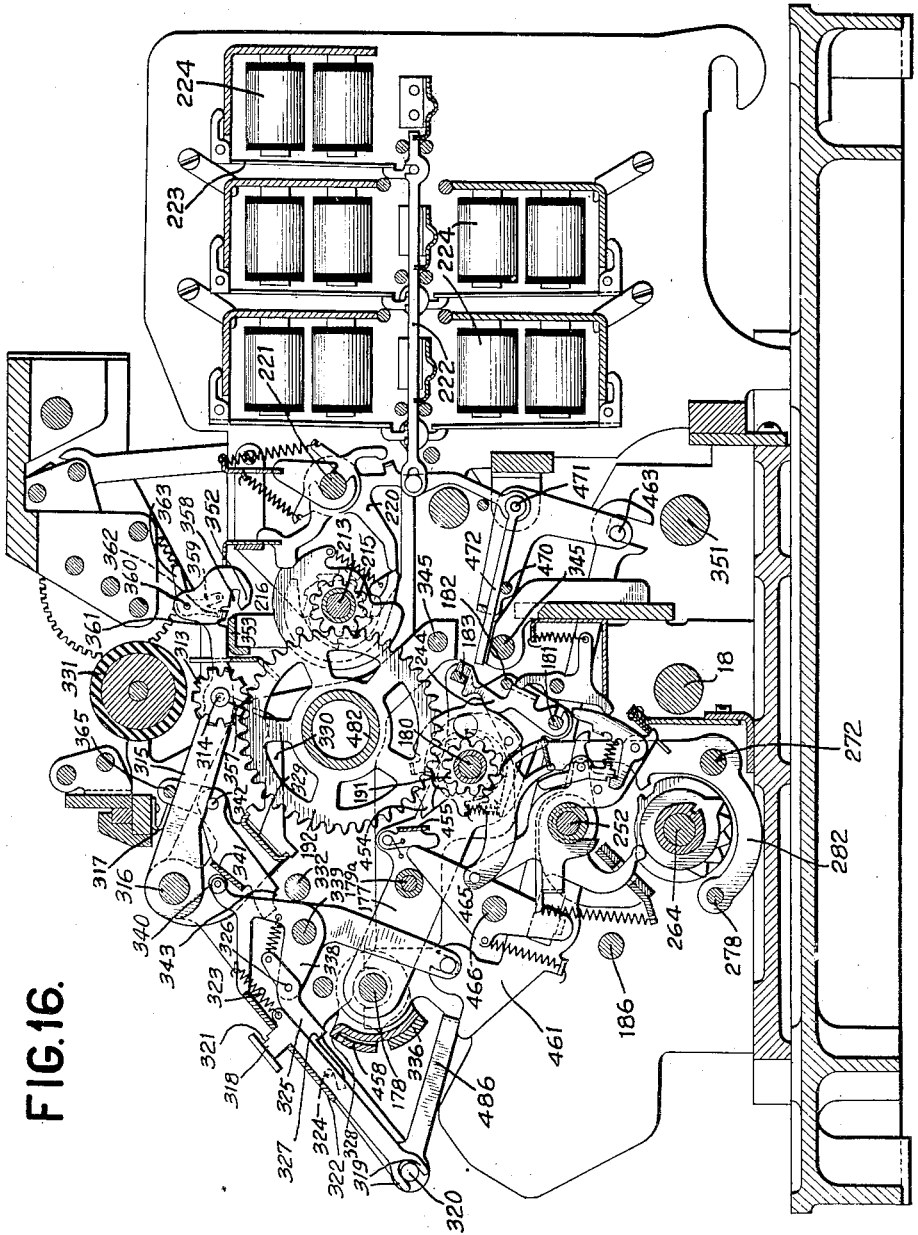

March 11, 1941.　　F. L. FULLER ET AL　　2,234,241
TABULATING MACHINE
Filed Nov. 5, 1936　　20 Sheets-Sheet 14
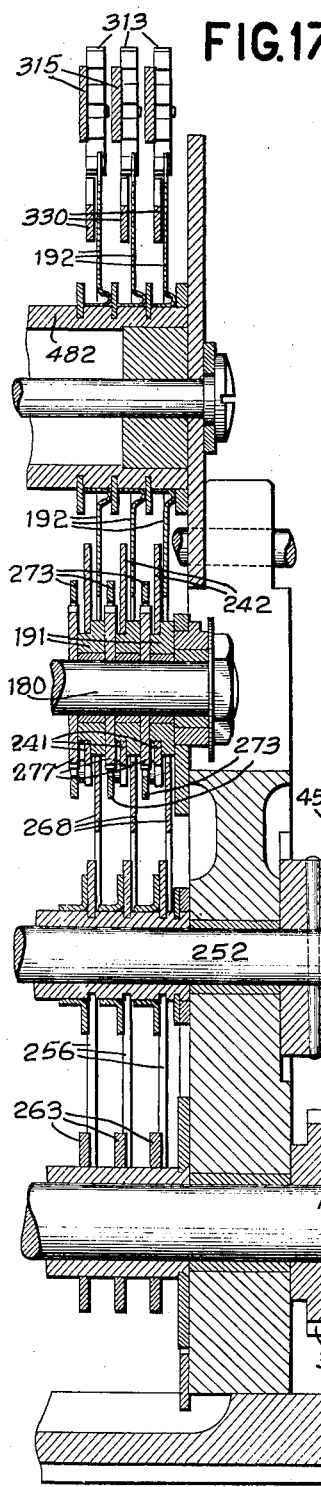
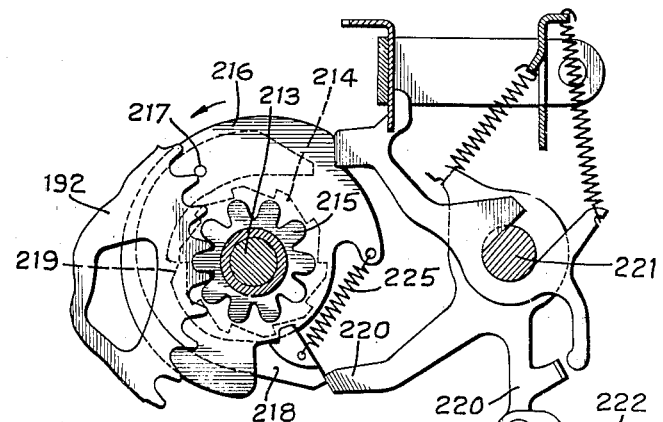
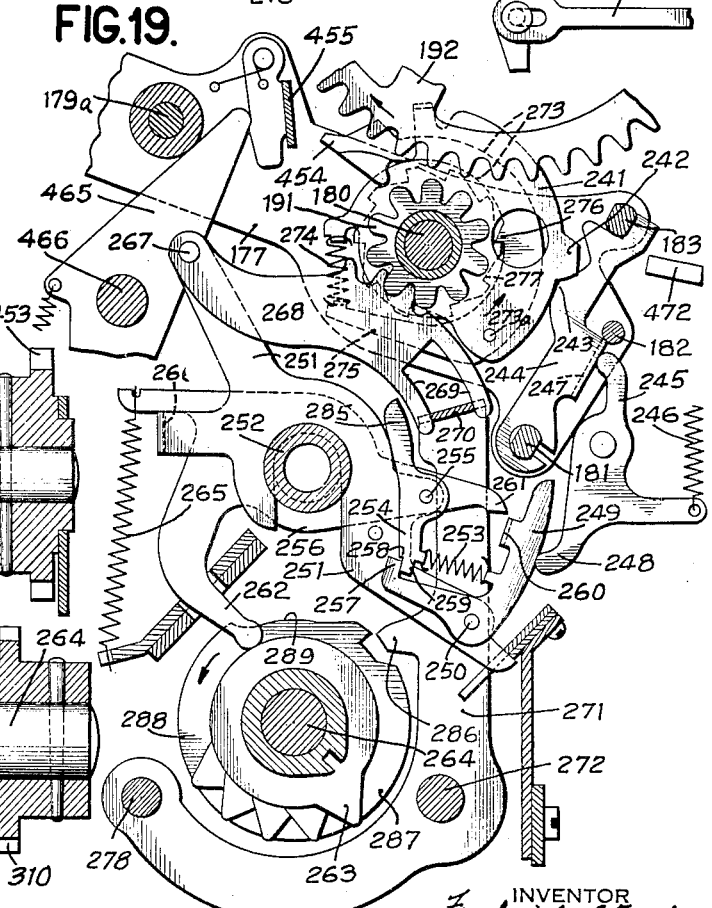
INVENTOR
Frederick L. Fuller
George F. Daly
BY
ATTORNEY

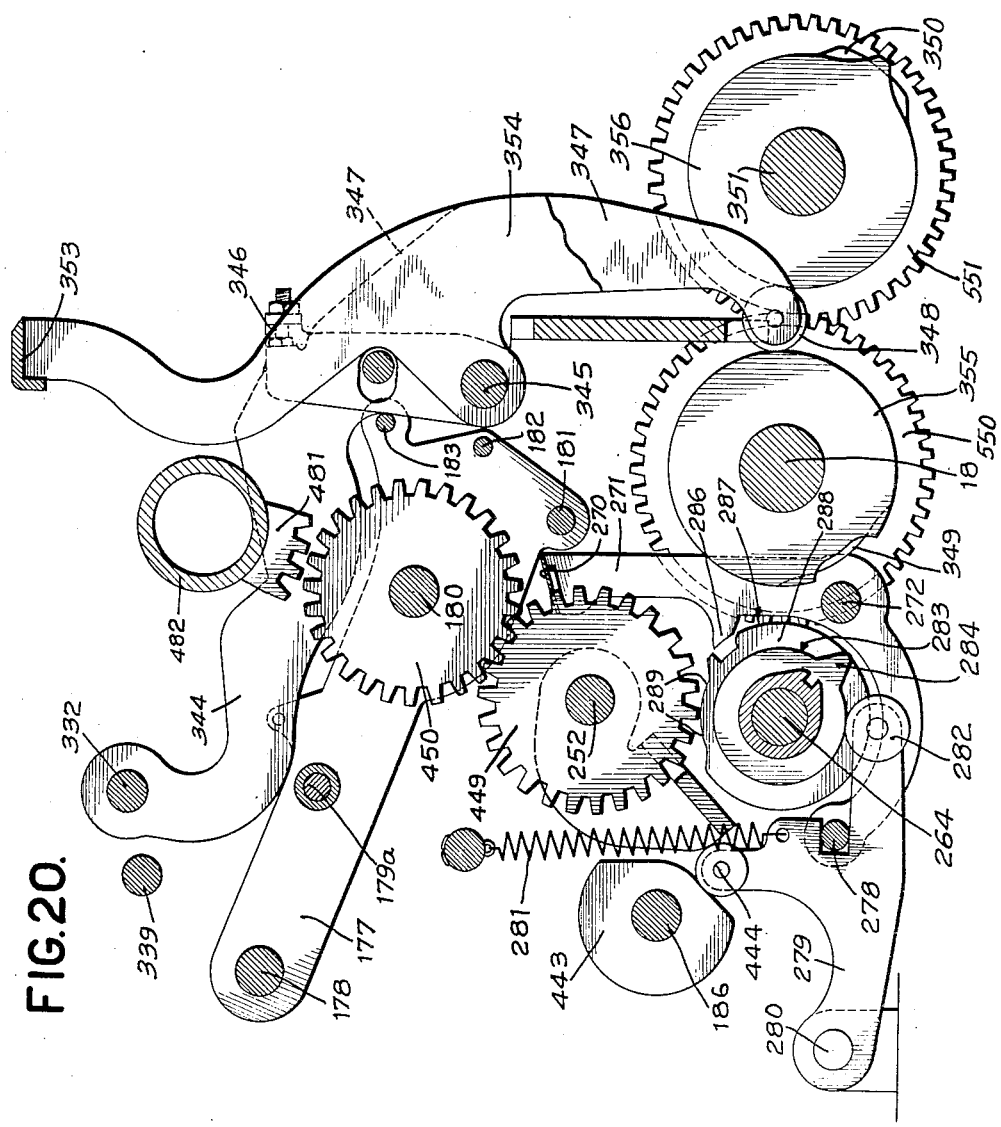

March 11, 1941.  F. L. FULLER ET AL  2,234,241

TABULATING MACHINE

Filed Nov. 5, 1936  20 Sheets-Sheet 16

INVENTOR
Frederick L. Fuller
George F. Daly
BY
ATTORNEY

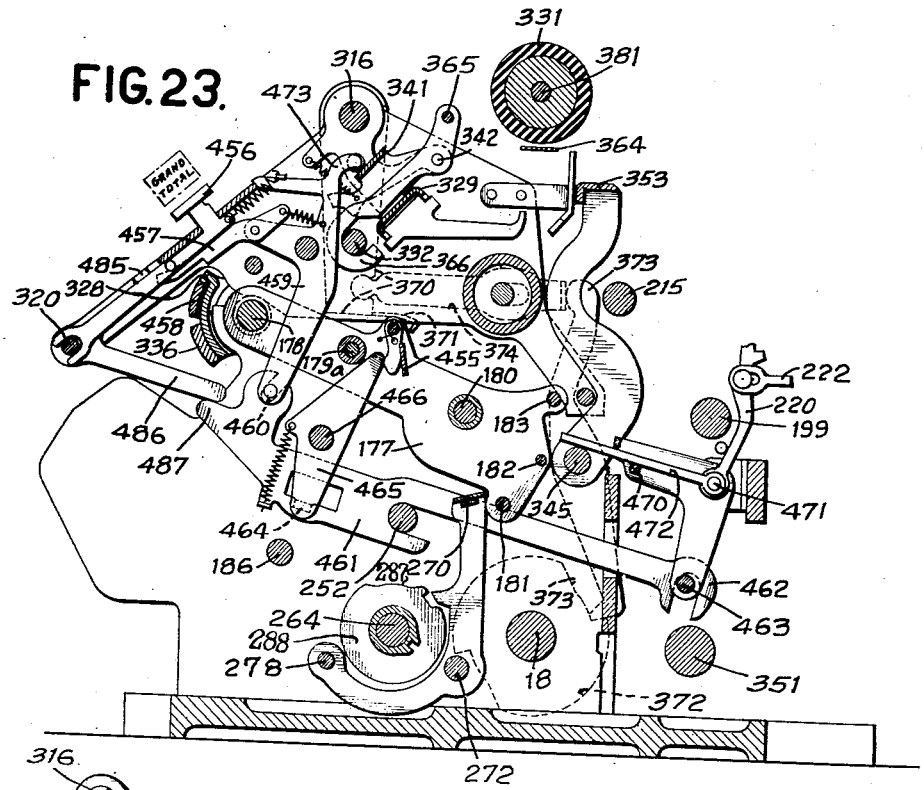
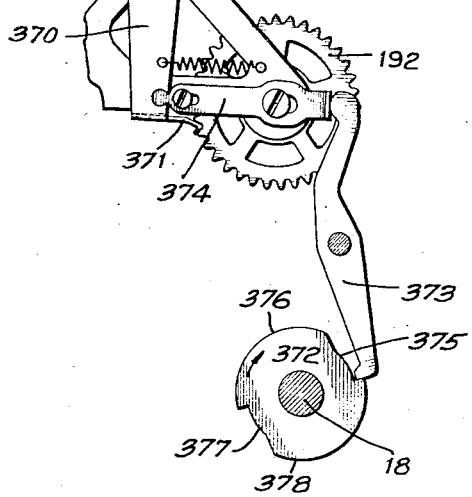

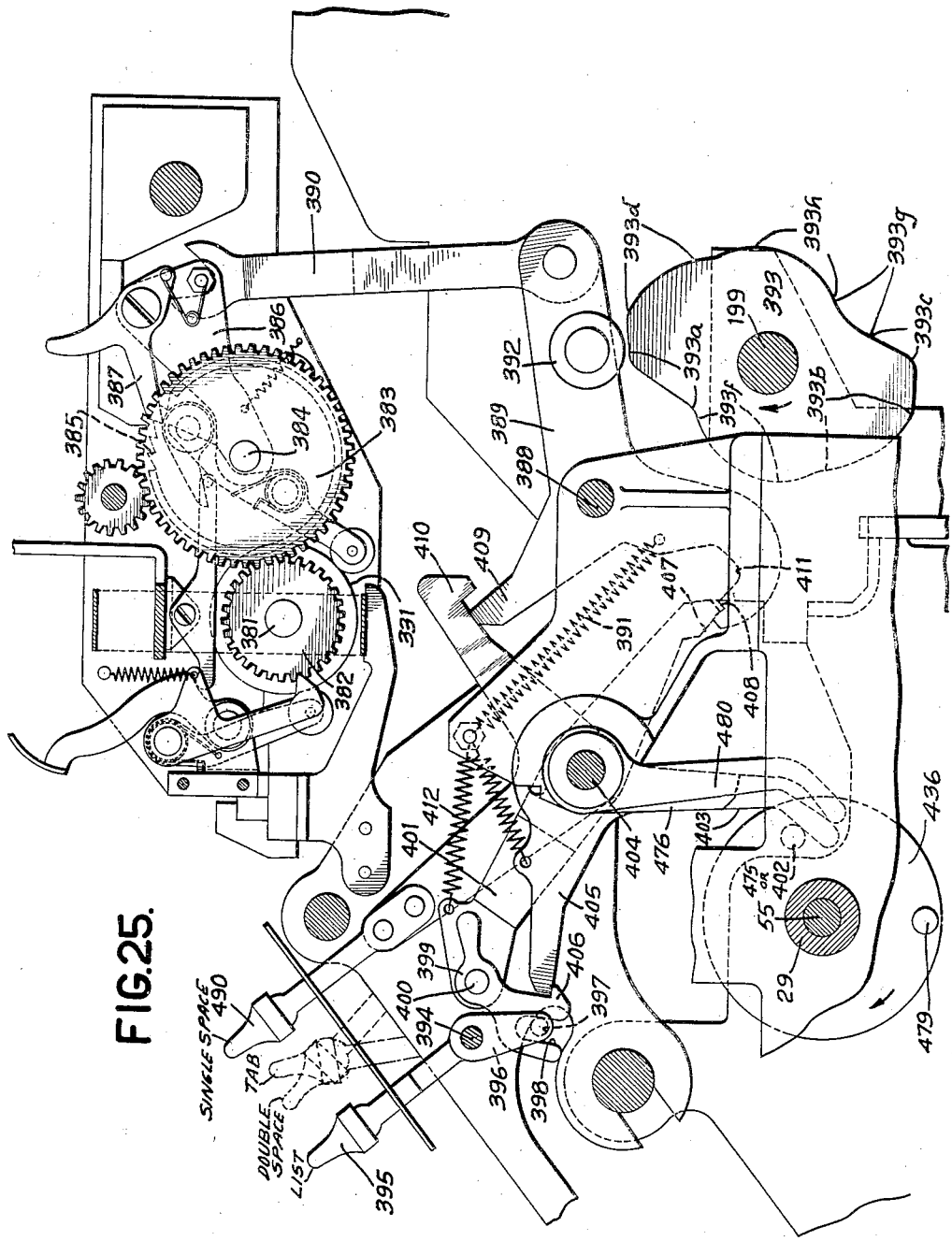

March 11, 1941.

F. L. FULLER ET AL 2,234,241

TABULATING MACHINE

Filed Nov. 5, 1936

ELECTRICAL AND MECHANICAL TIMING CHART OF MAIN DRIVE SHAFT 18.

INVENTOR
Frederick L. Fuller
George F. Daly
BY
[signature]
ATTORNEY

Patented Mar. 11, 1941

2,234,241

UNITED STATES PATENT OFFICE 2,234,241

TABULATING MACHINE

Frederick L. Fuller and George Francis Daly, West Orange, N. J., assignors to International Business Machines Corporation, New York, N. Y., a corporation of New York Application November 5, 1936, Serial No. 109,227

9 Claims. (Cl. 235—61.9)

This invention relates to calculating machines and particularly to machines of the type known as tabulating machines.

The main object of the present invention is the incorporation of improvements that will cause machines of this type to operate smoother to thereby make it possible to increase the speed of operation. Another important object is to insure the utmost accuracy in calculating and printing operations by the provision of an arrangement that insures that the same amount entered in the calculating mechanism is always printed, when listing the amounts.

With respect to the card feeding mechanisms it has, heretofore, been the practice to clutch the card feeding mechanism to a drive shaft while the latter is rotating, hence suddenly starting the operation of the card feeding mechanism from rest creating shocks and jerks which were deleterious to the mechanisms and the machine.

The present improvement is the provision of a novel Geneva driving mechanism for the card feeding mechanism which permits the clutch engagement when certain parts acquire their zero or minimum speed, and to cause the operation of the card feeding mechanism to be gradually accelerated from rest.

The novel driving mechanism is thereafter operative to drive the card feeding mechanism synchronously with the rotation of the main drive shaft, which latter causes the rotation of the totalizer or printing elements synchronously with the operation of the card feeding mechanism.

In order to provide easy access to the card feeding mechanism for the insertion and removal of the cards, servicing, etc., the card feeding mechanism is located at the top of the machine and in order not to unduly widen the machine the card feeding mechanism has preferably a short travel for the cards. Obviously where the card feeding mechanism has a cycle of operation corresponding to the cycle of operation of the drive shaft the desirable short travel of the cards is not possible so that another object of the invention is to cause the driving mechanism for the card feeding mechanism to decelerate its speed of operation and then hold it at rest while the main drive shaft thereafter rotates to cause certain operations in connection with printing and calculation.

Another and relatively important object relates to the construction of the card feeding mechanism which permits the upper portion to be hinged and separated from the lower portion for access. The upper portion controls locking mechanism which insures the proper enmeshment of cooperating gears and prevents the operation of the machine unless the two portions are operatively co-related.

Another object of the invention is the provision of a common actuating mechanism for the totalizer wheels and printing wheels thus always insuring that they are differentially rotated to the same extent and by a mechanism which is far simpler and less expensive to construct than heretofore.

Heretofore in tabulating machines reciprocable type bars have been utilized and while found to be practical and efficient type wheels have many preferred aspects as they are easily driven, manufactured and do not require as do type bars reciprocating mechanisms for their adjustment and restoration. In this manner it is possible to have the printing mechanism operate smoothly and without shocks or jerks.

Another object of the invention is to provide an improved construction of the printing mechanism which permits the individual rocking of each type wheel towards its platen thus permitting each to independently strike the platen to cause a line of print which is even in its impression characteristics.

In connection with the totalizers the improved construction permits the individual rocking of each totalizer towards its actuators and demeshment therefrom when the entry operation is completed so that the item type wheels may be subsequently restored to zero by the actuators without affecting the position of the totalizer wheels. The restoration of the type wheels is preferably performed while the card feeding mechanism is at rest.

Another important object of the invention relates to the unit carry mechanism and the unit entry segments have the additional function of normally holding the totalizer gears and preventing their accidental displacement. The shaft which causes the successive operation of the unit entry segments is idle during the item entering operation but is clutched into operation by the shaft which drives the card feeding mechanism and when the card feeding mechanism comes to rest and the carry shaft continues to function until the end of the machine cycle.

Another object of the present invention is to provide a total taking mechanism which operates smoothly and to this end the total taking shaft is driven by the Geneva driving mechanism for the card feeding mechanism and has precisely the same speed of operations with consequent advantages and improved results.

In carrying out total taking operations a resetting shaft to which the totalizer gears are normally clutched drives the totalizer gears through zero and as the latter pass through zero they connect the type wheels at differential times to the main drive shaft so that the type wheels are turned complementary extents to represent the total. The type wheels are reset to zero by the common actuators in the manner previously set forth and during the time that the total taking mechanism is idle.

Another object is the provision of manipulative devices for causing each totalizer to be employed in a total taking operation, with or without resetting thereof, and selectively as determined by the manipulative devices operated.

Still other objects reside in an improved and efficient line spacing mechanism, a control for effecting tabulating operations without accompanying listing operations and causing only the totals to be printed. In connection with line spacing operations their extent can be increased or decreased in accordance with the setting of a manipulative device.

Other objects which are far too numerous to be mentioned herein will be obvious as the specification is understood and all of which are attained in an efficient manner in construction and design and produce a tabulating machine having very desirable characteristics in operation, simplicity in construction and manufacture, servicing and appeal in commercial requirements.

While some of the improvements are incorported in a tabulating machine their disclosure should be considered as merely illustrative and not restrictive, since many of the improvements herein may, with equal benefits, be employed in calculating machines of other types.

Figs. 3 and 4 when joined together with Fig. 3 at the left is a perspective view of the main drive and driving connections therefrom to the card feeding unit and the accumulator operating mechanism.

Fig. 5 is a view in side elevation taken at the left end of the machine and shows the main driving connections for the accumulator operating mechanism.

Fig. 6 is a view in side elevation illustrating the Geneva driving mechanism.

Fig. 7 is a front view of the electro-magnetically controlled card feed and total taking clutch devices.

Figure 8:
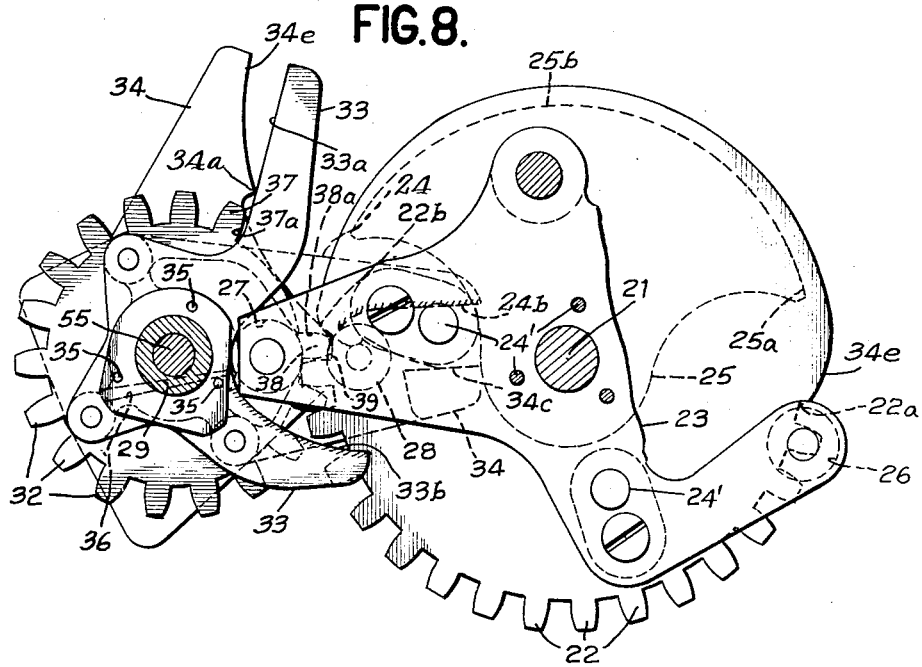
Figure 9:
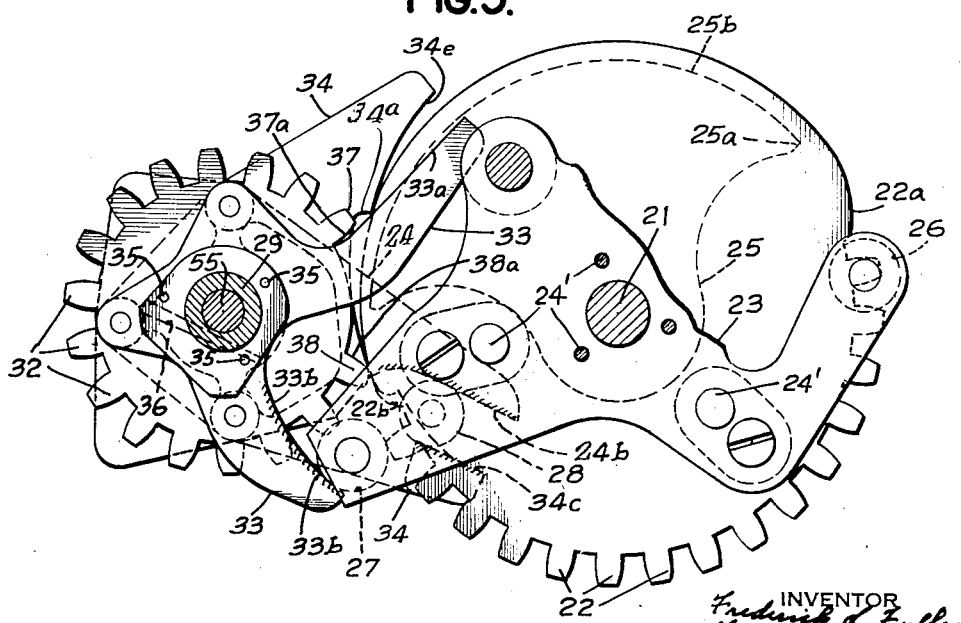

Figs. 8 and 9 are detail views of the Geneva driving mechanism in operated positions which are selected so as to facilitate the understanding of its operation.

Figure 10:
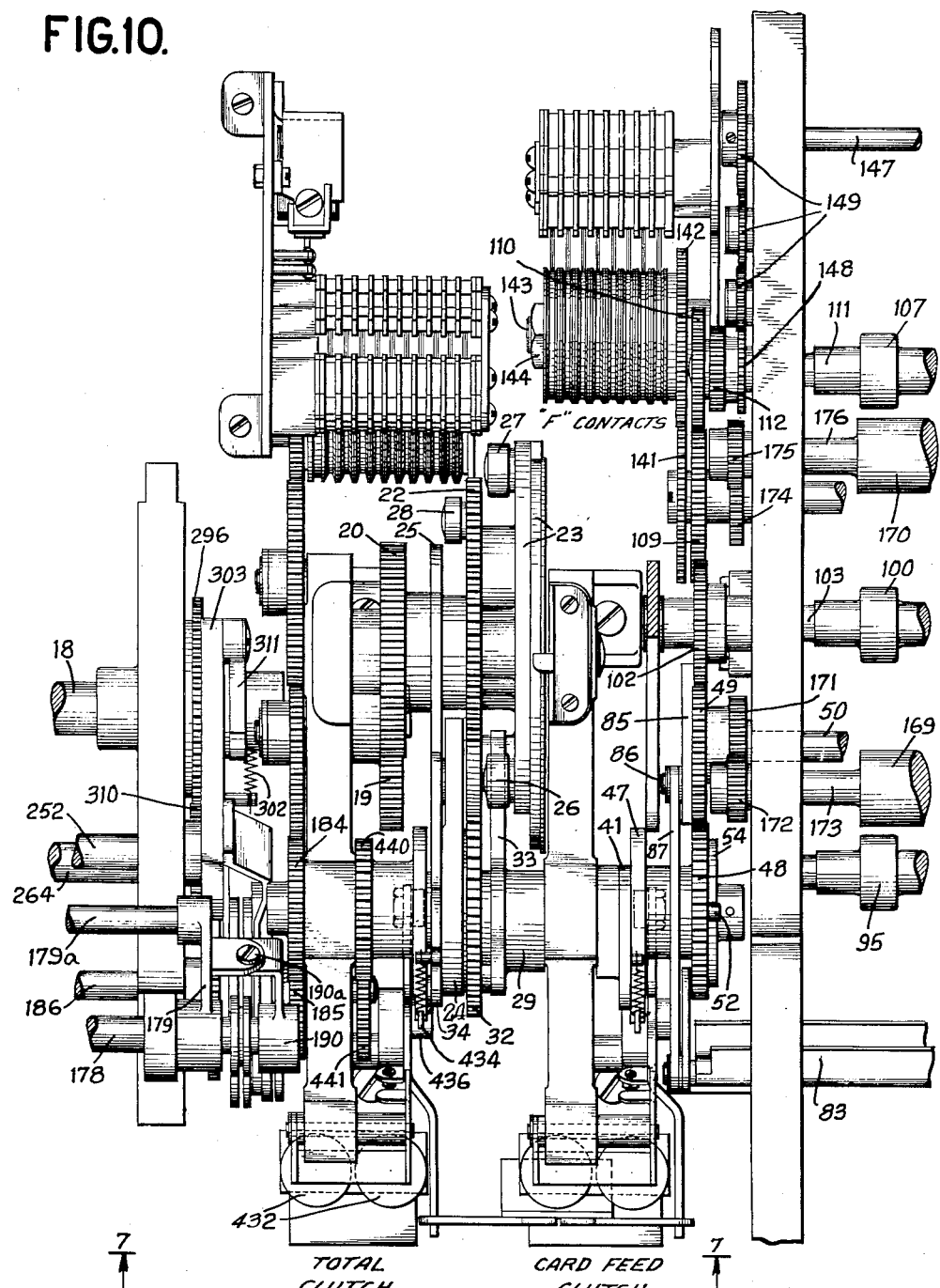

Fig. 10 is a plan view of the clutch control devices, the Geneva drive and the driving connections for the card feeding mechanism.

Figure 1:
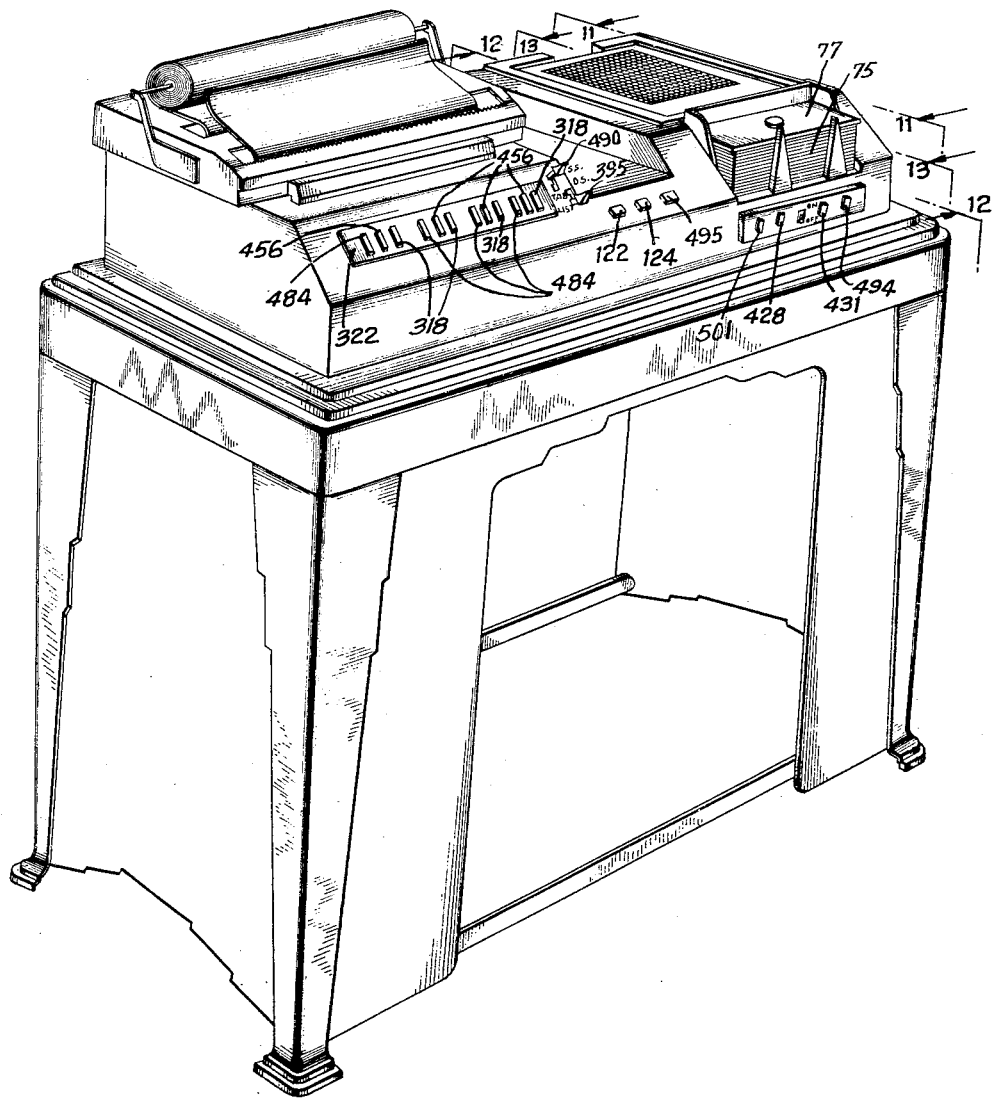
Fig. 1 is a perspective view of the improved tabulating machine incorporating the several inventions.

Fig. 11 is a view in side elevation showing the right hand side of the card feeding mechanism and is taken on the plane 11—11 of Fig. 1.

Fig. 12 is a view in side elevation showing the left hand side of the card feeding mechanism and is taken on the plane 12—12 of Fig. 1.

Fig. 13 is a central sectional view of the card feeding mechanism and is taken on the plane 13—13 of Fig. 1.

Fig. 14 is a perspective view of a card lever and its associated contact operating devices.

Figure 15:
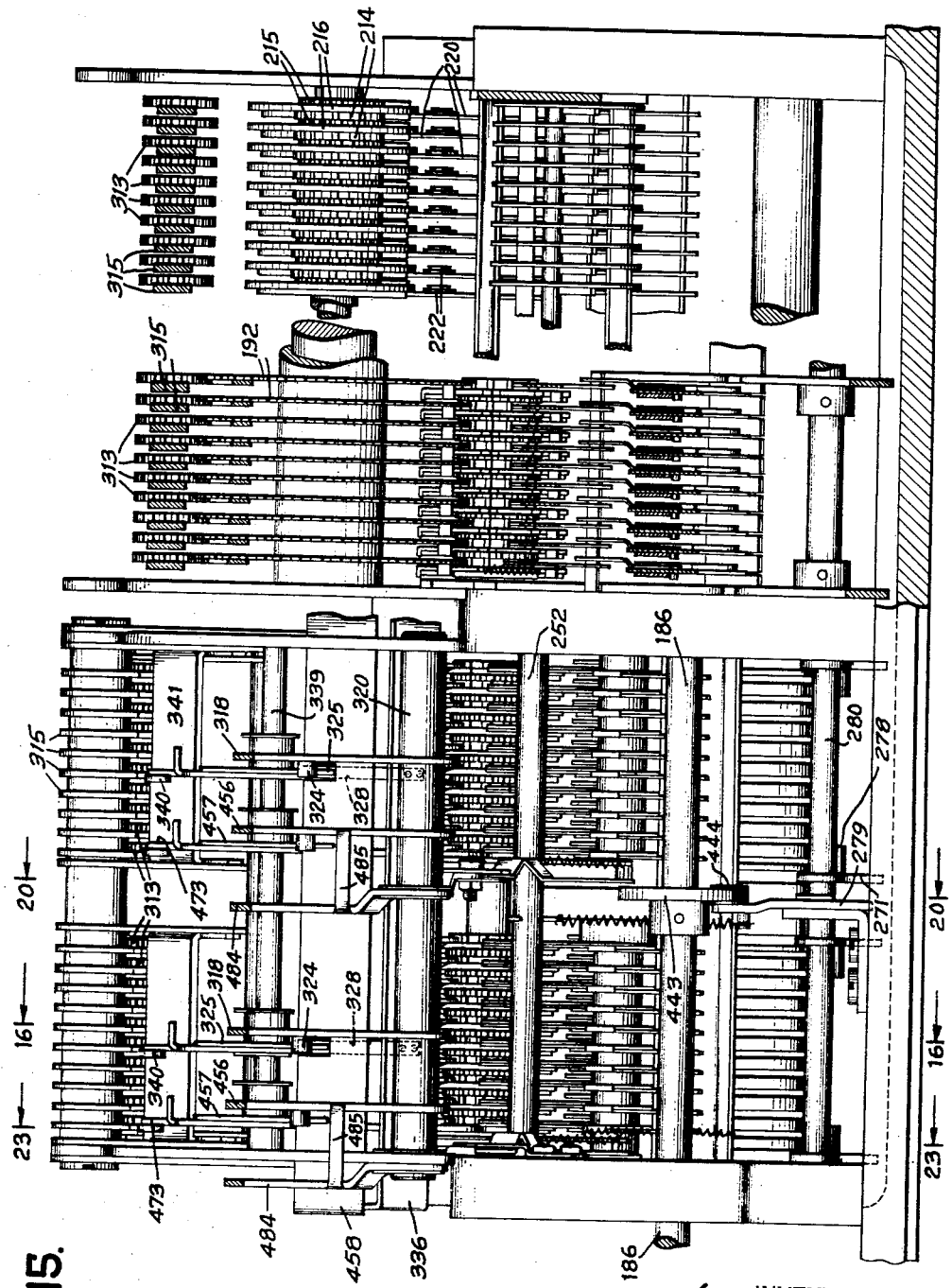

Fig. 15 is a view of the left hand end of the machine showing at the left in front elevation the totalizer and operating mechanism therefor and at the right of the drawing the same mechanism is shown in two different sectional views according to two different planes.

Fig. 16 is a sectional view taken on the line 16—16 of Fig. 15.

Fig. 17 is a sectional view showing the side spacing of correlated parts of the totalizer, totalizer operating mechanism, carry mechanism, and printing wheels.

Fig. 18 is a detail view showing the preferred form of electromagnetically controlled clutch for controlling the differential movement of a common operating gear for a printer and totalizer wheel.

Fig. 19 is an enlarged view showing particularly a totalizer gear and the unit carry mechanism therefor.

Fig. 20 is a sectional view showing particularly certain driving mechanisms of the machine and is taken on the line 20—20 of Fig. 15.

Figure 21:
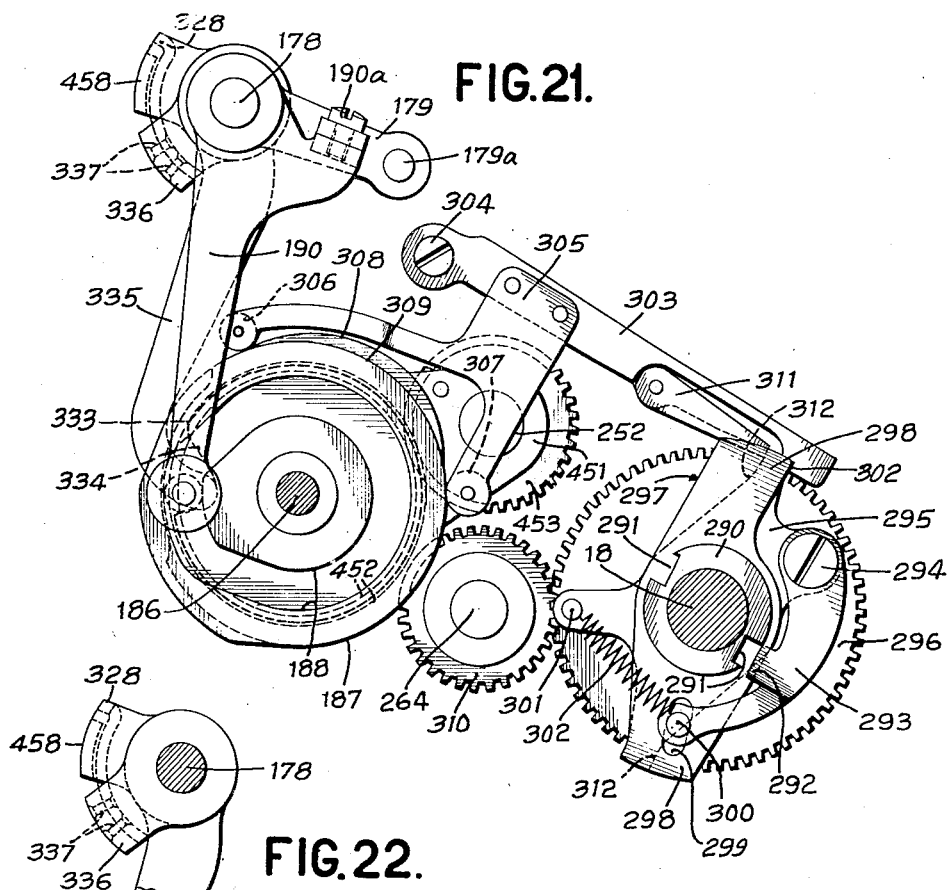

Fig. 21 is a view in side elevation showing the preferred form of clutch for controlling the selective operation of the units carry operating shaft.

Figure 22:
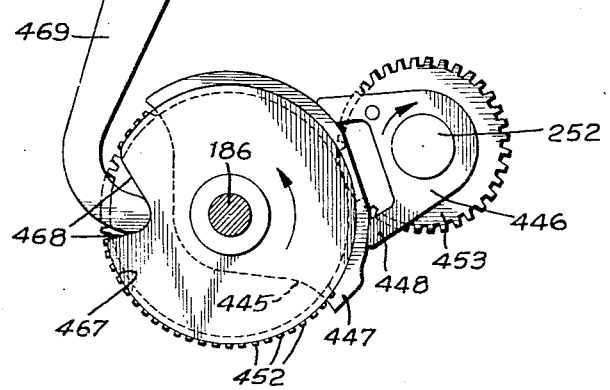

Fig. 22 is a detail view showing particularly a supplemental Geneva driving mechanism.

Fig. 23 is a sectional view taken on the line 23—23 of Fig. 15.

Fig. 24 is a detail view showing the operating connections for a bail which locks the universal operating gears at predetermined times.

Fig. 25 is a view in side elevation showing the improved paper spacing mechanism.

Figure 26:
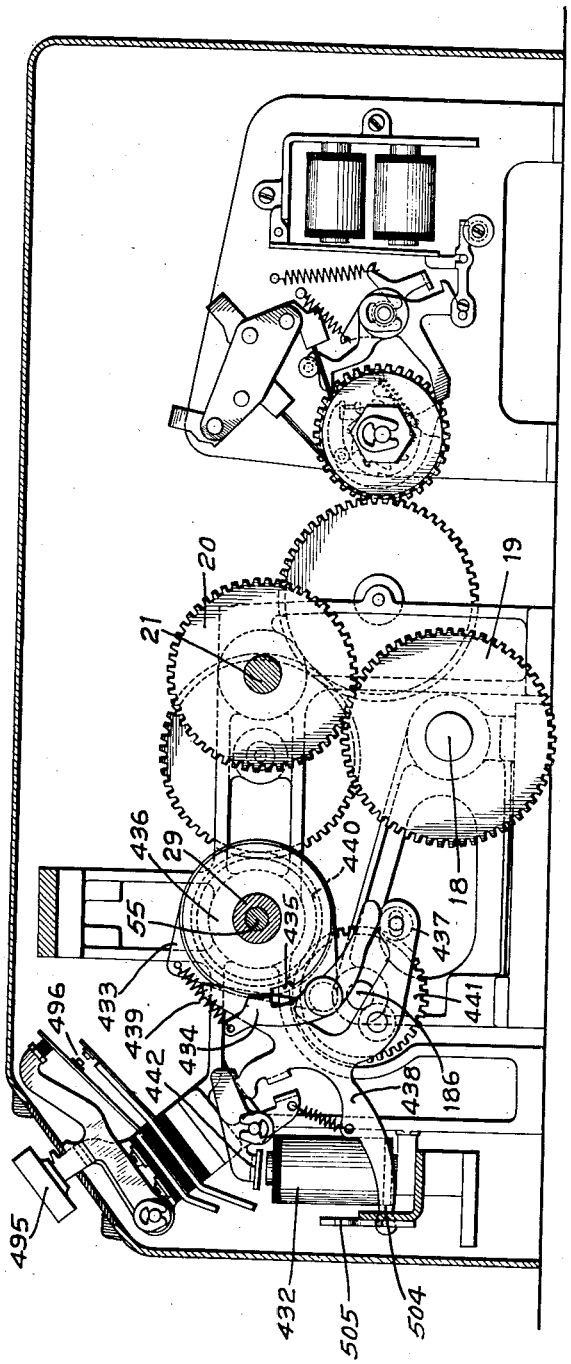

Fig. 26 is a view in side elevation showing the card feed clutch control mechanism.

Fig. 27 is a timing diagram of the machine.

POWER DRIVE

The motive power for the improved tabulating machine is derived from a motor 10 (Fig. 2) which through a belt connection 11 (Figs. 2, 3 and 5) drives a shaft of a generator 12. Attached to one end of the generator shaft is a worm screw 13 (Fig. 5) meshing with a worm wheel 14 attached to a shaft 15, the worm screw 13 and the worm wheel 14 providing a speed reducing mechanism so as to drive the shaft 15 at a speed reduced with respect to the shaft of the generator 12. Attached to the shaft 15 is a pinion 16 meshing with a gear 17 secured to a main drive shaft 18.

GENEVA DRIVE MECHANISM

Shaft 18 at its right end carries a gear 19 meshing with a gear 20, said gears 20 and 19 having a gear ratio 1:1. The gear 20 is fast to a stud shaft 21 and to which shaft there is secured a mutilated gear 22. An index wheel 23 (Fig. 6) which has the function of a roll carrier is pinned at 24' to the mutilated gear 22 and to a locking plate 25. Hence, the mutilated gear 22, index wheel 23 and locking plate 25 are attached together and also to the shaft 21 and rotate with said shaft as a unit and are driven at a constant and uniform speed by the main drive shaft 18.

The index wheel 23 carries a pair of rollers 26 and 27 and the mutilated gear 22 carries a roller 28 (see also Fig. 10). The above described parts form parts of a Geneva drive and the remaining parts of the Geneva drive will now be described.

A tube shaft 29 is journalled in side frames 30 and 31 (Fig. 7). A mutilated gear 32, a cam plate 33, and a cam plate 34 which has an integral cam plate 24 are pinned together by pins 35 and the entire assembly by a pin 36 is secured to said tube shaft 29.

Assuming that the drive starts with the position of the parts shown in Fig. 6, which is the position at the start of the accelerated movement given to tube shaft 29, at the initial counterclockwise movement of the roller 26 a portion 25a of the concentric portion of the locking plate 25 moves away from a shoulder 34a of cam plate 34 which unlocks tube shaft 29 and permits the rotation of the tube shaft 29. The roller 26 in its counterclockwise rotation will now coact with the cam surface 33a (the portion shaded) of cam plate 33 and as roller 26 rotates in a counterclockwise direction it will act on the cam plate 33 and rotate the latter in a clockwise direction and roller 26 will move in a concentric path towards the center of the tube shaft 29 and rotate the tube shaft 29 at a uniformly accelerated rotation until the center of tube shaft 29, roller 26 and shaft 21 are in horizontal alignment.

Attention is directed to the fact that the tooth 37 and the tooth 38 of the gear 32 are provided with cam edges 37a and 38a, respectively, and said cam edges 37a and 38a coact at different times with cam edges 22a and 22b respectively of the mutilated gear 22. The cam edges 37a and 22a coact during the above described accelerated movement for the purpose of holding roller 26 against the cam 33a and which was found, in practice, to be essential.

After the accelerated motion the teeth of the mutilated gear 22 will mesh with the teeth of the gear 32 and thereafter the latter is driven with a uniform speed of rotation and as will be evident later on this occurs during the time the index points are being analyzed and occurs with the driving of the accumulator wheels at a uniform speed of rotation.

At the termination of the uniform speed of rotation of the gear 32 the accumulator wheels have been set and all the index points have been analyzed and by mechanism now to be explained the tube shaft 29 is given a rotation at a decelerated speed.

The tooth space 39 of gear 22 is now engaged by the tooth 38 of gear 32 and at this time the rollers 27, 28 will be in a horizontal alignment with the centers of the tube shaft 29 and shaft 21, as shown in Fig. 8.

There are two possible conditions at this time which arise from different speeds of rotation effected by the main drive shaft. It will first be assumed that shaft 18 has been driven at such a speed as to cause the inertia stored in the members attached to shaft 29 to overthrow the unit carried by tube shaft 29 in a clockwise direction.

In this case the cam surface 24b (shaded) of cam plate 24 presses against roller 28, (Fig. 8) since the roller 28 at this time is below the cam surface 24b of cam plate 24. At the beginning of the deceleration cam surface 22b cooperates with the surface 38a of the tooth 38 to impart additional driving motion to the gear 32 as the teeth of the gears 22 and 32 de-mesh.

Assuming that the drive shaft 18 turns at a much slower speed so as not to overthrow the unit carried by tube shaft 29 the roller 27 is now positioned as shown in Fig. 9 so as to cooperate with the surface 33b (shaded) of cam plate 33 to drive the cam plate 33 and therefore the gear 32, also at a decelerated speed. It was found in practice that since roller 27 was located outside of the pitch line of gear 22 it was not practical to have the cam plate 33b of sufficient length to complete the movement of deceleration. Accordingly the auxiliary plate 34c of cam plate 34, which is offset so as to be in the plane of roller 28, cooperates with said roller 28 (see Fig. 9) to complete the movement of deceleration because roller 28 ultimately bears against the plate 34c in its counterclockwise rotation. The cooperation of roller 28 with both cam surface 24b and plate 34c takes place irrespective of the high or low speed of rotation of the drive shaft 18. At the completion of the deceleration, when tube shaft 29 has been given a full rotation, roller 28 rides out between cam surface 24b and plate 34c and gear 22 now completes its rotation to a full revolution to bring it to the position shown in Fig. 6 but during this rotation the tube shaft 29 will be held stationary. During the completion of the rotation of gear 22 the concentric surface 25b of the locking plate 25 coacts with the concentric surface 34d between 34e and 34c of the cam plate 34 to provide the desired locking action to hold tube shaft 29 stationary while shaft 21 is further rotated.

The above described Geneva drive mechanism is utilized to drive a card feeding mechanism through a clutch device shown in Figs. 4 and 12. The gear 32, it will be recalled, is attached to the tube shaft 29 and the latter carries an arm 41 to which is pivoted at 42 a clutch dog 43 urged by a spring 44 to cause a clutch tooth 45 to fit in a notch 46 of a disk 47 rotatable with a gear 48 which meshes with a gear 49 secured to a shaft 50. The disk 47 and gear 48 are secured to a sleeve 51 loosely mounted on the sleeve 29.

Fixed to gear 48 is a pin 52 engaging a slot 53 in a disk 54 attached to a shaft 55 which is journalled inside the sleeve 29, this construction causing tube shaft 29 by the clutch device to rotate disk 47, sleeve 51, gear 48, disk 54, and shaft 55 during card feeding operations.

A roller 56 carried by an arm 58 coacts with the lower end 59 of the clutch dog 43 so as to prevent in each rotation of arm 41 the clutch tooth 45 from engaging the clutch notch 46 except when a magnet 60 attracts its armature 61 and which latter is supported by a bell crank 62 pivoted at 63. The nose 64 of the bell crank 62 normally catches over an extension 65 of the arm 58. When nose 64 is disengaged from the extension 65 a spring 66 causes arm 58 to rock and move the roller 56 out of cooperation with the lower end 59 of the clutch dog 43 so that since at this time the clutch tooth 45 is positioned over the periphery of disk 47 it will enter said notch 46 while the disk 47 is at rest so that subsequently the arm 41 through the clutch dog 43 will drive the disk 47 for one revolution. This engagement takes place at substantially the termination of a machine cycle when the speed of rotation of tube shaft 29 is at a minimum providing card feed is to be effected during the following cycle. Hence, the mechanism driven by the clutch device is started in operation very gradually and without shock or jerks, and which is accomplished by the Geneva drive just described.

To positively knock-off the armature and cause its retraction against the attraction due to residual magnetism and to restore arm 58 to its normal position a pin 67 carried by the disk 47 engages a projection 68 of the arm 58, and rocks the arm (see timing in Fig. 27 for pin 67) so that it is relatched by the nose 64 and held relatched by spring 66. An adjustable screw 69 carried by the arm 58 engages a projection 70 of the bell crank 62 and positively restores the armature to a normal position effected by the tension in the spring 66.

CARD FEEDING MECHANISM

The card feeding mechanism is best shown in Figs. 10 to 14 inclusive and by referring to Fig. 13 it will be noted that the supply of tabulating cards 75 is placed in a hopper 76 and upon the top of the stack of tabulating cards there is placed the customary weighted presser plate 77 so as to press the stack of tabulating cards downwardly to cause the left edge of the lowermost card to be engaged by a picker 78. The tabulating cards are of a form shown in the patent to C. D. Lake, No. 1,772,492 dated August 12, 1930, and each card is provided with 80 columns of data which is adapted to be analyzed and tabulated.

From Fig. 11 it will be seen that to the shaft 50 there is attached a disk 79 to which is pivoted at 80 a link 81 and said link is pivoted at 82 to a picker operating frame 83 which is pivoted at 84. This connection is shown in Fig. 11 for one side of the frame 83 and referring to Fig. 12 it will be observed that a similar connection is provided for the other side of the frame 83 and comprises a disk 85 rotatable with gear 49 and to which disk 85 there is pivoted at 86 a link 87 which also has a pivot connection to the picker operating frame 83.

Referring now to Fig. 13, it will be seen that the frame 83 has attached thereto an arm 88 having a forked connection to a pin 89 carried by a slidably mounted plate 90 and which carries the aforesaid picker 78. During the initial accelerated movement imparted to the shaft 50 by the means previously described, the picker 78 by its engagement with its lowermost tabulating card 75 will force said card out of the stack and through a card throat 91 to various sets of feeding rollers which are also driven by the shaft 50 by trains of gearing now to be described in detail. The timing for picker 78 is shown in Fig. 27.

Referring to Fig. 11, it will be seen that to the shaft 50 there is secured a gear 92 which is in mesh with a pinion 93 attached to a shaft 94 which carries the lowermost feeding roller 95 of the first set (see Fig. 13). To the shaft 94 there is attached a gear 96 meshing with a pinion 97 attached to a shaft 98 which carries the uppermost feeding roller 99 of the first set (see Fig. 13).

The second or the intermediate set of feeding rollers comprises a lowermost roller 100 and the uppermost roller 101 which are driven by a gearing now to be described by reference to Figs. 10 and 12. The gear 49 meshes with a gear 102 which is attached to a shaft 103 which carries the lowermost feeding roller 100. The shaft 103 has attached thereto a pinion 104 meshing with a pinion 105 which is attached to the shaft 106 which carries the uppermost feeding roller 101.

The third set of feeding rollers comprises a lowermost roller 107 and an uppermost roller 108 (Fig. 13) and the gear drive for these rollers will now be described with particular reference to Figs. 10 and 12. The gear 102 is in mesh with a gear 109 which meshes with a pinion 110 attached to a shaft 111 which carries the lowermost feeding roller 107. To the gear 110 there is attached a pinion 112 meshing with a pinion 113 attached to a shaft 114 which carries the uppermost feeding roller 108.

By the above described gearing, the three sets of feeding rollers will feed the card as it emerges from the card supply magazine past the first or control brushes 115 (Fig. 13) and past the second or adding control brushes 116 and thence to a storage magazine 117.

Reference has previously been made to the card feeding clutch control magnet 60 which is energized to control card feeding operations and the electrical means by which card feed is initiated and continued for successive tabulating cards will now be described with particular reference to the wiring diagram shown in Fig. 2.

As previously stated, the machine is provided with a generator 12 and said generator is adapted to supply alternating current to line wires 118 and 119 and direct current to line wires 120 and 121 and said direct current and alternating current supply is adapted to furnish current for the energization of various magnets substantially in a manner which is in accordance with the patent to J. W. Bryce, No. 1,926,890 dated September 12, 1933, and to which reference may be had for the description of the generator which is generally described herein.

When the start key 122 is depressed a circuit will now be made from the A. C. line side 118 through the card feeding clutch control magnet 60, contacts 123 now closed, the manually controlled stop key contacts 124, the manually closed start key contacts 122 now closed, through relay contacts 125a now closed, and through the contacts C—1 to the other A. C. line side 119. The machine herein is provided with a series of machine controlled contacts designated herein as the C contacts and F contacts and these contacts are adapted to close at predetermined times in the machine operation and their timing fully is disclosed in the timing diagram shown in Fig. 27 and to which reference is to be had for the theoretical timing of such contacts.

The group of C contacts are timed to close by driving means which will now be described in detail with particular reference to Figs. 3 and 5. The gear 17 meshes with a pinion 126 and rotatable with said pinion is a pinion 127 meshing with a gear 128 attached to a shaft 129. Each of said C contacts is in the form of a commutator comprising as shown for one C contact a pair of brushes 130 and 131 adapted to make electrical contact with a segment 132 which is carried by a disk 133 of insulation and rotated by the shaft 129.

Obviously the timing of the closure and the opening of the various circuits is controlled by the length of the commutator segments 132 each of which is designed in accordance with the particular times of closing and opening of the circuits.

Referring now to the timing diagram with the start key held depressed, when contacts C—1 are closed the energization of the card feed clutch magnet 60 causes the engagement of the clutch and the feeding of the lowermost card from the supply hopper 76 to a position where the leading edge of the card is almost in contact with the first set of brushes 115 (see Fig. 13). After the first cycle of machine operation, the start key is again depressed to cause further feeding of the card to the right as viewed in Fig. 13 and during this second cycle of operation, the card which is fed will pass over a card lever 134 and rock the same about its pivot 135 (Figs. 13 and 14) to cause an extension 136 thereof to act on a pusher rod 137 to close card lever controlled contacts 138.

Referring now to the wiring diagram, with the card lever contacts 138 closed, the circuit extends from the direct current line side 121 through contacts C—3, card lever contacts 138, relay magnet 139, relay magnet 140 to the other direct current line side 120 causing, when contacts C—3 close, the energization of the relay magnet 139 and the closure of its relay contacts 139a. From the timing diagram, it will be seen that contacts C—3 close at the time the card lever contacts 138 are closed. The relay magnets 139 and 140 will be held energized by the closure of the relay contacts 139a and cam contacts C—4 which close early in the next cycle of machine operation before cam contacts C—3 open. By means of the closed relay contacts 140a, contacts C—1, and contacts F—1 which close at the last part of the card feeding cycle when contacts C—1 close an impulse will be transmitted to the card feed clutch magnet 60 so as to cause automatically a third cycle of machine operation during which operation the card passes the adding control brushes 116.

The manner in which the various F contacts are controlled in operation will now be described with particular reference to Figs. 10 and 12. To the gear 109 there is attached a gear 141 which meshes with a gear 142 secured to a shaft 143 which carries the commutator segments for controlling the F—1 contacts. From Figs. 10 and 12, it will be seen that the end of the shaft 143 is threaded so as to receive a nut 144 which not only clamps the various commutators on the shaft 143 but permits by the unloosening of the nut 144 the individual adjustment of each of said commutators. This construction is also provided for the C contacts.

Referring now to Fig. 13, it will be seen that when the card emerges from the last set of feeding rollers 107 and 108 it is inclined downwardly beneath a plate 145 so as to pass under a mutilated rubber roller 146 attached to a shaft 147.

Referring now to Figs. 10 and 12, it will be seen that the feed roller carrying shaft 111 has attached thereto a gear 148 which drives the shaft 147 through a train of gears 149. As the roller 146 rotates, it will engage the top surface of the card (see Fig. 27, timing of "Stacker roll—146") and further feed it so that its leading edge abuts the angled portion 150 of the plate 145 at which time the card is in the storage hopper 117. The roller 146 may turn further so as to be free of the top card fed in the supply hopper.

Figure 2:
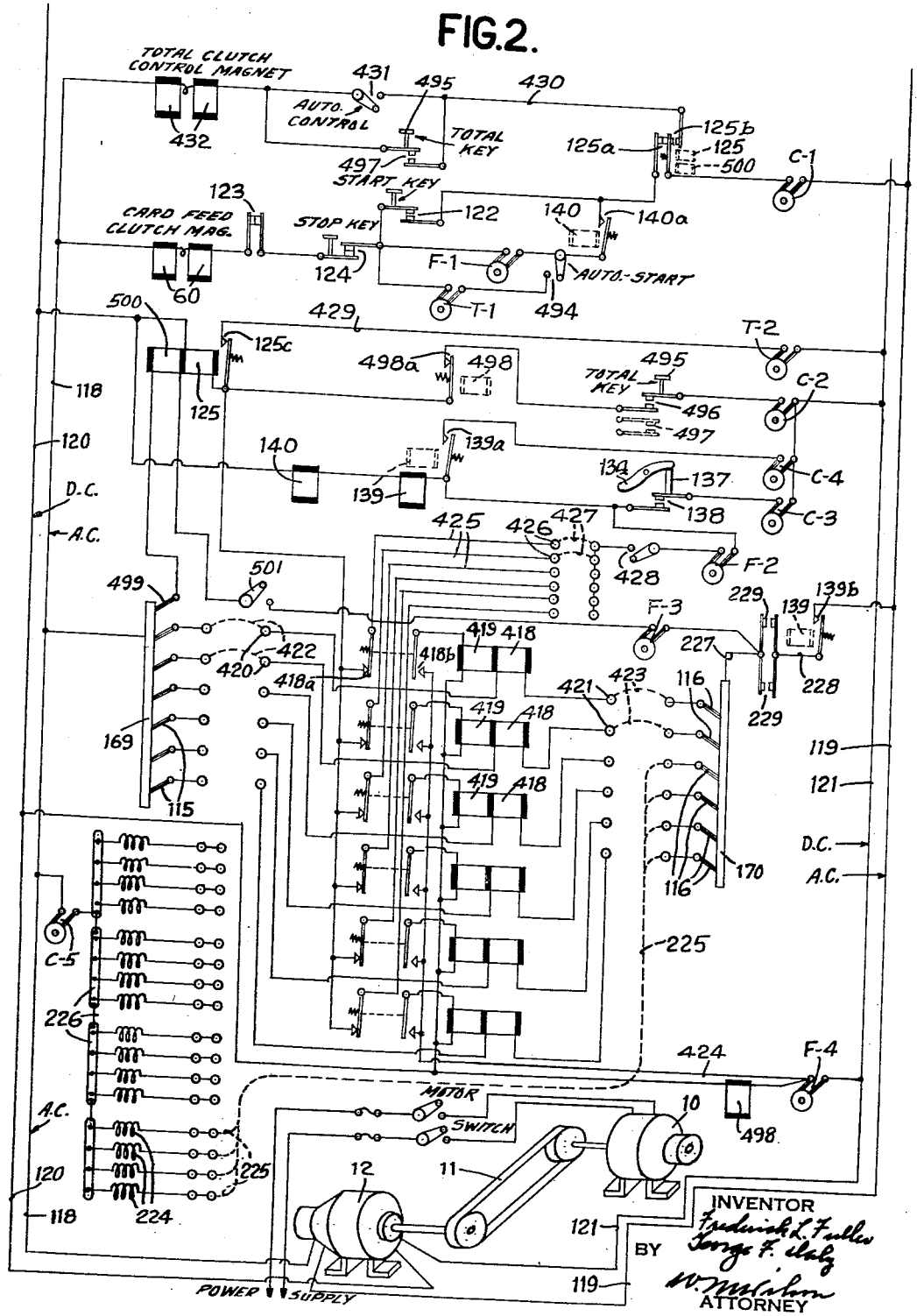
Fig. 2 is an electrical wiring diagram.

Referring to the wiring diagram in Fig. 2 and to the timing diagram, it will be evident as long as cards are fed so as to retain the card lever contacts 138 closed, at the termination of each card feed cycle contacts F—1 will close so as to transmit an impulse to the feed clutch control magnet 60 causing the successive feeding of the cards.

The card feeding unit is provided with an improved construction whereby the upper set of feeding rollers and other parts may be elevated for access to the feeding mechanism for the purpose of adjustment, inspection, cleaning, etc.

From Figs. 11 and 12, it will be seen that the upper portion 151 of the card feeding unit is hinged at 152 to the lower section of the card feeding mechanism and in order to rigidly hold both portions in cooperation there is pivoted in the upper section 150 at 153 a pair of hook shaped members 154 and 155 adapted to catch or hook over rollers 156 and 157, respectively, so as to hold both sections firmly together. The members 154 and 155 are tied together by a bail member 158 provided with a contact operating portion 159 adapted when both sections are operatively correlated to close the aforesaid contacts 123. By manually withdrawing the hooks of the members 154 and 155 out of cooperation with the studs 156 and 157, the upper section may be rocked around the pivot 152 and at this time the contacts 123 will be open by their resiliency due to the removal of the contact operating portion 159.

Referring to the wiring diagram, the opening of contacts 123 will prevent the energization of the card feed clutch control magnet 60 thereby preventing feeding of the cards unless both sections of the card feeding mechanism are in proper operative relationship.

In order to insure the proper meshing of the correlated gears 112 and 113 and 104 and 105 (Fig. 12) and gears 96 and 97 (Fig. 11) there is provided a slidably mounted plate 160 (Fig. 12) which is pivoted at 161 to a double arm 162 pivoted at 163 and having a top portion 164 coacting with the aforesaid yoke 158. When the upper section is unlatched springs 165 will be free to urge the plate 160 to the right as shown in Fig. 12 thereby causing projections 166 and 167 thereof to engage with the teeth of gears 113 and 105, respectively, and a projection 168 to engage with a gear attached to shaft 98 holding said gears in such position that the teeth of gears 113, 105, 97 (Fig. 11) will engage the interdental spaces of the correlated gears 112, 104, and 96 respectively when the upper section is lowered to its normal position.

The above described mechanism will effectively prevent the breaking of teeth of the coacting gears.

The brushes 115 and 116 make contact through the perforations in the tabulating card with rotatable contact rollers 169 and 170 and to present clean surface to the brushes, it is desirable that these contact rollers be rotated.

From Fig. 10, it will be seen to the gear 49 there is secured a pinion 171 meshing with a pinion 172 attached to a shaft 173 to which the contact roller 169 is secured.

Also referring to Fig. 10 to the gear 109 there is attached a pinion 174 meshing with a pinion 175 attached to the shaft 175 to which the contact roller 170 is attached.

TOTALIZERS AND TOTALIZER OPERATING MECHANISM

The tabulating machine is preferably provided with a plurality of totalizers and in the present machine four totalizers are provided and each is adapted to receive an amount involving as high as ten denominational orders. In view of the fact that the construction of the several totalizers is alike, the description of the construction of a single totalizer will only be given herein.

The construction of the totalizers and associated operating mechanism is best shown in Figs. 3, 4, and 15 to 19. As is best shown in Figs. 3 and 16, each totalizer comprises a side frame 176 and a side frame 177, both of which are secured to a pivot shaft 178. The side frames 176 and 177 of each totalizer are connected by cross members comprising in part, a rod 179a (see Fig. 20), a totalizer wheel supporting shaft 180, and cross rods 181, 182, and 183, the cross members just referred to providing a rigid totalizer frame.

Referring particularly to Fig. 4, it will be seen that the shaft 55 has secured thereto a gear 184 meshing with a gear 185 loosely mounted upon a shaft 186 and to said gear there is attached a box cam 187 the cam slot 188 of which receives a roller carried by the lower end of an arm 190 loosely mounted on shaft 178 (Figs. 10 and 21) and which has a screw connection 190a to an arm 179 fixed on the shaft 178. The rod 179a is carried by the arm 179 and passes through the several side frames of the totalizers.

It will be recalled that through the Geneva drive mechanism shaft 55 is given an initial accelerated rotation and during this rotation the cam slot 188 will be immediately effective to rock the arm 190 and through the connection just described rock the several totalizer frames to bring the related sets of totalizer gears 191 which are loosely mounted upon the related shafts 180 into engagement with operating gears 192 loosely mounted on a tube 482 (Fig. 17). The timing of the movement of the totalizer frames is shown in Fig. 27 in the timing for cam 187.

Summarizing, therefore, at the initial rotation of shaft 55 the four sets of totalizer gears 191 will be engaged with a corresponding number of sets of operating gears 192.

Referring particularly to Figs. 3 and 5, to the drive shaft 18 there is attached a box cam 193. A slidable member 194 is provided with bifurcations 195 adapted to straddle the drive shaft 18 and said member 194 is provided with a pair of driving racks 196 and 197. The rack 197 is normally in engagement with a pinion 198 secured to a drive shaft 199. The member 194 is provided with an elongated slot 200 and normally engaging the upper edge of the slot 200 is a pin 201, which pin is carried by an integral extension of a yoke member 202 pivoted upon a rod 203. The member 194 has attached thereto a roller 204 cooperating with a cam slot 205 of the box cam 193 to thereby cause the elevation and lowering of the member 194 to an extent and at times dependent on the formation of the cam slot 205. See timing of cam slot 205, Fig. 27. The yoke member 202 is provided with a downward extension 206 carrying a roller 207 fitting within a cam slot 208 formed in the gear 17. The shaft 199 is provided with a pair of gears 209, 210 meshing with gears 211 and 212 respectively, which are secured to a drive shaft 213, the rotations of the shaft 213, both in number and in time of operation, being controlled, as will subsequently be evident, by the cam slots 208 and 205 in the gear 17 and box cam 193, respectively.

In order to control the differential rotation of the totalizer gears 191 by the shaft 213, a clutch device is provided for each denominational order and an example thereof is shown in Figs. 16 and 18. For each denominational order there is secured to the shaft 213 a clutch wheel 214 and loosely mounted upon the shaft 213 is a pinion 215 meshing with the operating gear 192. Attached to the pinion 215 is a disk 216 to which is pivoted at 217 a clutch dog 218 provided with a clutch tooth 219 adapted to engage with one of the teeth of the ratchet wheel 214. The clutch tooth 219 is normally held out of engagement with the ratchet teeth by means of the inclined arm of a three-armed member 220 which is pivoted upon a rod 221. The vertical arm of the three-armed member has a link connection 222 (Fig. 16) to the armature 223 of the controlling magnet 224. The magnet 224, as will be subsequently explained, is energized by an electrical impulse transmitted thereto under control of a card perforation at a differential time and coincident with the analyzing of the perforation.

It will be recalled that during the initial movement of acceleration given to the shaft 55 (Fig. 4) the totalizer gears 191 are engaged with the operating gears 192 and coincident with this operation a portion of the cam slot 208 in the gear 17 is effective to rock the yoke member 202 so as to cause the rack 197 to be moved out of engagement with the pinion 198 and the rack member 196 to be moved into engagement therewith (see timing of cam slot 208, Fig. 27) but during this time the cam slot 205 is ineffective to elevate the member 194 and there will be, therefore, during the totalizer engagement, no movement of the shaft 213. Thereafter the cam slot 205 (see timing of cam slot 205, Fig. 27) will be effective to elevate the member 194 and by means of the continued engagement of the upper rack 196 with the pinion 198 effected by the cam slot 208 the shaft 213 will be rotated and at a uniform speed, and coincident with the driving of the feeding rollers at a uniform speed past the analyzing brushes, the totalizer gears 191 being held during this operation into engagement with the operating gears 192 by the cam slot 188.

Assuming that a magnet has been energized by an impulse transmitted at a differential time, say a "9" impulse (see Fig. 27) the armature 223 (Fig. 16) thereof will be attracted and the link 222 drawn to the right, thereby rocking the arm 220 (Fig. 18) so as to release the clutch dog 218 for movement by its spring 225, thereby causing the clutch tooth 219 to engage one of the teeth of the ratchet wheel 214 and thereby causing the rotation of the pinion 215 and the operating gear 192 in mesh therewith for nine steps. The latter will rotate and continue to rotate the correlated totalizer gear 191 until the member 194 (Fig. 3) is elevated to its highest position and shaft 213 has been rotated one revolution.

Summarizing, therefore, it is obvious that the rotation of each totalizer gear will begin at a differential time but terminate irrespective of the extent of rotation at a predetermined time which occurs coincident with the completion of the first revolution of shaft 213. See Fig. 27 explaining the timing to add "1" and "9" and timing of "2 Rev. shaft 213."

Attention is directed to the fact that when the member 194 has reached its highest elevation and the shaft 213 has been rotated one revolution and the totalizer gears have been differentially rotated the box cam 187 (Fig. 4) will be effective to reversely rock the several totalizer frames, thereby disengaging the totalizer gears 191 from the operating gears 192.

When the member 194 reaches its extreme upward position, the cam slot 208 will then be effective to rock the yoke 202, thereby disengaging the rack member 196 from the pinion 198 and engaging the rack 197 with the pinion 198, this engagement being maintained during the lowering of the member 194 under control of the cam slot 205, so as to cause a second revolution of shaft 213 in the same direction.

During the second revolution of shaft 213 the clutch connection between the shaft 213 and the operating gear 192 is maintained for a reason which will be later apparent as the invention is further understood.

Referring particularly to the wiring diagram in Fig. 2, there will now be described the electrical control whereby the magnets 224 are energized at differential times. From the alternating current line side 118 the circuit leads through contacts C—5, to a common wire connection 226 for one side of each of the magnets 224 and by plug connections such as 225 to selected control brushes 116. The magnets 224 of a selected set may be controlled by the adding control brushes 116 of a selected card field by such plug connections. The contact roller 170 in the circuit has a wire connection 227 to circuit breaker contacts 229, the circuit then extending by a wire 228 to the relay contacts 139b, and thence to the other alternating current line side 119.

The interrupter contacts 229 are also shown in Fig. 11. As shown in Fig. 12, the gear 141 is attached to a shaft 230 and said shaft, as shown in Fig. 11, has attached thereto a gear 231 meshing with a gear 232 to which is secured a dentated wheel 233 adapted to cooperate with a roller 234 of a circuit breaker arm 235. The interrupter contacts 229 are adapted to cause the transmission of electrical impulses to the adding control brushes 116 at times coincident with the analyzing of the index points. With particular reference to the timing diagram, it will be seen that the contacts C—5 are retained closed during the time that impulses are being transmitted to the brushes 116 and it will be further understood that the relay contacts 139b are also retained closed by the energization of the card lever control magnet 139 during this time.

It is further to be understood that by suitable plugging connections any selected totalizer may be controlled by any selected card field so that the amounts represented in the same field of a series of tabulating cards may be accumulated by a related totalizer.

CARRY MECHANISM

Each totalizer is provided with a carry mechanism for carrying units from the lower order totalizer elements to the higher order totalizer elements and is of a type known in the art as independent actuator, successive. The carry mechanism for the several totalizers is alike and for this reason a description will be given in connection with the carry mechanism of only a single totalizer and the carry mechanism now to be described is provided for each totalizer wheel except for the units order and is best shown in Figs. 16, 17, 19, 20, and 21.

Each totalizer wheel has secured thereto a disk 241 provided with a carry over tooth 242 which is adapted when a totalizer gear 191 passes from nine to zero to engage a projection 243 of an arm 244 which is pivoted upon the rod 181. A three armed member 248 is adapted to have the upward vertical arm 245 thereof urged by a spring 246 connected to another arm of said member 248 so that such upward vertical arm normally coacts with a lug 247 of the arm 244. Another arm of the three armed member engages one arm of a bell crank 249 which is pivoted at 250 to a plate 251 and which plate 251 is loosely mounted upon a rod 252. A spring 253 is compressed between the bell crank 249 and an arm 254 which is pivoted at 255 on said plate 251. The normal compression in the spring 253 urges a projection 257 of one arm of said bell crank to be engaged by a shoulder 258 of the arm 254.

It will be recalled that during an item entering operation for a totalizer that a totalizer gear 191 is rotated and this rotation will be effected in a counterclockwise direction as viewed in Figs. 16 and 19. If a totalizer gear 191 passes through zero the carry tooth 242 thereof will engage the projection 243 rocking the arm 244 clockwise and also rocking the three armed member 248 clockwise so that the arm thereof rocks the bell crank 249 counterclockwise as viewed in Figs. 16 and 19.

This rocking of the bell crank will cause the projection 257 to be disengaged from the shoulder 258 whereupon the additional compression placed upon the spring 253 will rock the arm 254 to the left and now cause the projection 257 to engage with a shoulder 259 of the arm 254 thereby latching the bell crank in such a position that a lug 260 thereof is beneath a projection 261 of a plate 256 which is loosely mounted on the rod 252. This will be the position of the parts if a carry operation is to ensue and this position will be maintained when the totalizer gears 191 are subsequently lowered out of actuation with the operating gears 192 so that a carry operation may be effected without any actuation of the operating gears 192.

Each plate 256 is provided with a downward extension 262 adapted to engage with a related cam 263 secured to a shaft 264 it being noted that the series of cams 263 is spirally arranged about the shaft 264 so as to cause the successive operation of the plurality of arms 262 at times indicated by diagonal points shown in Fig. 27 for the timing of cams 263. The sequence is such that the arm 262 for causing a unit carry in the tens order is first actuated, then the arm 262 for causing the unit carry in the hundreds order is actuated, and so on, up to the highest denominational order.

Attached to the plate 256 is a spring 265 which is adapted to rock the plate 256 so that it bears against a lug 266 of the plate 251 and also causes the arm 262 to contact with the profile of the correlated cam 263. Pivotally mounted upon the plate 251 at 267 is a segment rack 268 which is bifurcated at 269 to receive a bail 270 of a yoke member of which arm 271 comprises one arm. The yoke is loosely pivoted upon a rod 272. When the totalizer frame is in its lowered position the totalizer gears 191 engage with the carry segments 268 so as to prevent the accidental displacement of the totalizer gears and this position is also effected prior to the operation of the carry segments 268 to carry a unit in the totalizer gear 191 of the next higher order.

When the high portion of the cam 263 engages the correlated arm 262 it will rock the plate 256 clockwise and by the engagement of the projection 261 with the lug 260 the plate 251 will be rocked clockwise since the line of force acts upon the pivot 250 which is the pivot connection between the bell crank 249 and the plate 251. Since the plate 251 is rocked clockwise the transfer segment 268 will be moved to the right and also downwardly guided by the bail 270 thereby effecting the carry operation and causing the totalizer wheel of the next higher order to receive the entry of a unit.

It is pointed out that the carry tooth 242 is actuated by the totalizer gear 191 of a lower order wheel but that the carry segment 268 is in the plane of the totalizer gear 191 of the next higher order.

Pivoted at 273a to the disk 241 is a clutch pawl 273 which is urged by a spring 274 compressed between an extension of the disk 241 and an extension 275 of the clutch pawl 273 so that a clutch tooth 276 of the clutch dog normally engages a tooth of a ratchet wheel 277 which is fast to the shaft 180 said shaft being carried by the totalizer frame and for the present being considered as non-rotatable. When a totalizer gear is rotated one step in a counterclockwise direction to receive the carry, the clutch dog will be rotated in the same direction so that the clutch tooth 276 thereof catches over the next higher tooth of the non-rotatable ratchet wheel 277 thereby holding the transfer segment 268 and parts operated concurrently therewith in operated position.

It is, of course, necessary that the parts of the carry mechanism which are operated be returned to normal prior to the successive item entry operation for a totalizer. To this end, the following described mechanism is provided and is common to the several totalizers utilized.

From Fig. 20, it will be seen that a rod 278 of the yoke which is pivoted at 272 is received by an open slot of an arm 279 which is loosely pivoted upon a rod 280 and is urged by a spring 281 so that a roller 282 carried by the arm 279 normally engages the profile of a cam 283 attached to the shaft 264 thereby holding the bail 270 rigid during the operation of the carry segments 268. After the successive carry operations have been effected up to and including that for the highest denominational order the high portion 284 of the cam 283 will act at a time shown in Fig. 27 for timing of cam 283 upon the roller 282 and rock the arm 279 clockwise about its pivot 280 and by its connection with the rod 278 it will rock the bail 270 downward thereby withdrawing all of the segments 268 including those which have been employed in the carry operations out of engagement with the totalizer gears 191 whereupon the segments employed in the carry operations will be returned to normal position by means of the springs 265. At the same time the bail 270 will coact with extensions 285 (Fig. 19) of the arms 254 which have been operated thereby disengaging the shoulder 259 of each arm 254 from the extension of the correlated bell crank 249 and causing the arm 254, bell crank 249, the three armed member 245 and arm 244 to occupy their normal position shown in Fig. 19.

To further insure that the bail 270 is firmly held during the carry operations the arm 271 is preferably provided with an extension 286 adapted to engage the circular portion 287 of a cam 288 secured to the shaft 264. The cam 288 is provided with a recessed portion 289 to permit the rocking of the bail 270 by the cam 283 in the manner previously described. The timing of the cam portions 287, 289 is shown in Fig. 27 in the timing for cam 288.

The driving mechanism whereby the shaft 264 may be rotated to effect the carry operations will now be described with particular reference to Figs. 3 and 21.

Referring to Fig. 21 to the main drive shaft 18 there is secured a disk 290 provided with alternatively engageable clutch notches 291 adapted to be engaged by the clutch tooth 292 of a clutch dog 293 which is pivoted at 294 to a plate 295. The latter is attached to a gear 296 which is loosely mounted on the shaft 18. Also loosely mounted on the shaft 18 is a clutch control member 297 provided with a pair of arms 298 and one of said arms has a slot 299 receiving a pin 300 and between said pin 300 and a pin 301 attached to the plate 295 is a spring 302 normally tending to engage the clutch tooth 292 with one of the clutch notches 291 but said engagement is normally prevented by the engagement of one of the arms 298 with a shoulder 302 of a clutch arm 303 pivoted at 304.

To cause the clutch arm 303 to be rocked to enable spring 302 to effect the engagement of the clutch at a predetermined time as shown in Fig. 27 in the timing for cams 308, 309, to the arm 303 there is secured a member 305 carrying rollers 306 and 307 engaging a pair of complementary formed profile cams 308 and 309 secured to the shaft 186.

These cams are adapted to rock the clutch arm 303 when the shaft 18 has been given a half a revolution so that after the entry operation the gear 296 will drive a gear 310 secured to the carry mechanism operating shaft 264, rotating the latter one complete revolution to perform the carry operations.

After the start of the half revolution of gear 296 the clutch arm 303 is lowered to cause its shoulder 302 to engage one of the arms 298 at the completion of a half revolution of the gear and rock the clutch dog 293 out of engagement with a clutch notch 291. A pawl 311 pivoted to the clutch arm 303 engages with one of the extensions 312 of the plate 295 to prevent retrograde movement of the plate 295 and the member 297 and to firmly hold the plate 295 and member 297.

This form of clutch is well known in the art and for this reason is only generally explained herein.

ITEM LISTING MECHANISM

It is desirable to have incorporated in the machine a printing mechanism which is adapted to successively list the items which are tabulated under control of the successive tabulating cards. The present machine is provided with a simple and efficient printing mechanism which is capable of carrying out the requirement. This mechanism is best shown in Figs. 16, 20, 21, 22 and 23.

Considering the printing mechanism for a single totalizer, it will be seen that each operating gear 192 is normally in mesh with a printing gear wheel 313 (Fig. 16) which is pivotally mounted by a stud 314 on a lever 315 loosely mounted upon a shaft 316. A flat spring 317 is adapted to retain the printing gear wheel 313 into a gear engagement with the operating gear 192 so that the printing gear wheel 313 will be set to a differential position by the gear 192 at which time printing will be effected simultaneously from the series of printing gear wheels 313 correlated with each totalizer.

The machine, as shown in Fig. 1, is provided with a plurality of list control keys 318 there being one list key 318 provided for each totalizer. Suitable mechanism operated when each list key 318 is depressed is adapted to cause item printing from a set of printing gear wheels 313.

The construction of the mechanism operatively correlated with the several list keys is identical for all the keys and as shown in Fig. 16 for one of said keys the list key 318 is provided with bifurcations 319 which straddle a shaft 320. When the button of the list key is manually depressed a shoulder 321 thereof will cooperate with a cover plate 322 permitting a spring 323 attached to the list key 318 to draw the key 318 upwardly so that the shoulder 321 engages the cover plate 322 thereby holding the list key in depressed position and which position will be maintained until the depressed list key is shifted downwardly slightly to disengage the shoulder 321 from the cover plate 322 to permit the return of the list key to normal position.

As shown in Fig. 16, the list key 318 carries a pin 324 adapted when the list key is depressed to rock a double arm 325 about a pivot 326 to bring a shoulder 327 of the double arm in the path of a listing control finger 328.

As best shown in Fig. 16, a bail 329 loosely mounted upon the shaft 316 is provided with a plurality of fingers 330 each adapted when a printing gear wheel 313 has been moved from a "0" position to be correlated with an interdental space of a related gear wheel 313 so that upon the elevation of the finger 330 to engage the interdental space the related lever 315 will be rocked and move the printing gear wheel 313 towards but not in contact with a printing platen 331.

The means for rocking the plurality of fingers 330 carried by the plurality of bails 329 (there being one bail for each totalizer) comprises a rod 332 which is operated by means to be subsequently described.

From Fig. 21 it will be seen that loosely mounted on the shaft 186 but rigidly attached to the box cam 187 is a profile cam 333 and said cam at the initial accelerated movement given to gear 185 (Fig. 4) to which it is fixed is adapted by a cam portion 334 thereof to rock an arm 335 which is loosely mounted upon the shaft 178. The arm 335 is secured to a bail 336 loosely mounted upon the shaft 178 and said bail 336 has attached thereto by rivets 337 a plurality of the listing control fingers 328 and said fingers are suitably spaced so as to contact with the shoulders 327 of each of the plurality of arms 325 for the four listing keys. The timing of the movement of bail 336 effected by cam 333 is shown in Fig. 27 in the timing for cam 333. When the finger 328 which is in contact with a correlated shoulder 327 is rocked by means of the cam 333 a bell crank 338 which is loosely mounted upon a rod 339 and which is pivotally connected to the arm 325 by the pivot 326 will be rocked clockwise as shown in Fig. 16 causing a roller 340 of said bell crank to rock a bail 341 which is pivoted at 342 to the bail 329 thereby bringing an extension 343 of said bail 342 over the rod 332. The mechanical correlation of the extension 343 and the rod 332 will be effected at the initial operation of the machine and will be maintained during the movement of the rod 332 which is moved by means now to be described with particular reference to Fig. 20.

The rod 332 is the cross rod extended between a pair of arms 344 which are loosely mounted upon a shaft 345 and one of said arms 344 has an adjustable screw connection 346 to an arm 347 which is also mounted upon the rod 345 and which carries at its lower end a roller 348 adapted to cooperate with complementary formed cams 349 and 350, the latter being mounted upon a shaft 351 which has a suitable driving gear connections 550—551 from the shaft 18 to which is attached the cam 349.

After the printing gear wheels 313 have received their differential rotation and with the extension 343 of the bail 341 still in contact with the rod 332, the cams 349 and 350 will rock the arm 344 clockwise about the pivot rod 345 and thereby through the coaction of the rod 332 with the extension 343 rock the bail 329 counterclockwise about its pivot 316 and one or more of said bails 329 will be rocked in accordance with the prior depression of the associated list keys 318. The fingers 330 of the bail 329 will be rocked in engagement with the interdental spaces of the printing gear wheels 313 and will elevate said gear wheels and move them into contact with the platen 331 at the time shown in Fig. 27 for the timing of cams 349—350. At this time further means is now effective to give an additional upward movement to the selected sets of the printing gear wheels 313 so as to positively press the latter against the platen 331 which is preferably of some resilient material. This additional means will now be described with particular reference to Figs. 16 and 20.

Each of the levers 315 is provided with an extension having a beveled portion 352 adapted when each lever 315 is rocked to be aligned with the beveled portion of a bail 353 which is loosely mounted upon the rod 345. A depending arm 254 of the bail 353 carries a roller (similar to roller 348) which coacts with complementary formed cams 255 and 356 attached to the shafts 18 and 351, respectively.

When the printing gear wheels have been elevated by the means previously described, the bail 353 will be rocked at a time shown in Fig. 27 for the timing of cams 255—356 to cause a further elevation of the printing gear wheels by means of the camming action between the bail 353 and the beveled portions 352 of the extensions of the levers 315 to contact with the platen 331. By this means a clear imprint is made upon a record strip surrounding the platen 331 through the usual form of inking ribbon 364 (Fig. 23) which is interposed between the record strip and the printing gear wheels 313.

From Fig. 23 it will be seen that for each bail 329 there is pivoted at 342 a bail comprising a rod 365 overlying the levers 315 (see Fig. 16) and one arm of the bail has a hook 366 hooking over the rod 332 so that when the rod 332 returns the rod 365 will positively rock the levers 315 to normal position, assisted, of course, by the springs 317.

ZERO ELIMINATION MECHANISM AND ZERO INSERTION MECHANISM

It is of course undesirable to print zeros at the left of the digit of the highest denominational order and in the present construction this is effectively prevented by providing each printing gear wheel 313 with a slot 357 (Fig. 16) adapted when the printing gear wheel is at the "0" position to receive the associated finger 330 when it is elevated thereby preventing elevation of the printing gear wheel 313 which is at zero. In such instance, the bail 353 will enter a slot 358 of the extension of the unmoved lever 315.

However desirable this may be in the circumstances just explained it is necessary to fill in zeros for denominational orders which are at the right of a digit which is other than "0" and which is printed. For example, in printing the amount to —2.03— it is necessary to cause the lever 315 of the tens denominational order to be elevated even though the printing gear wheel 313 of such order is at "0" position.

In the present machine this is effectively provided by a means which is well known in the art and which comprises coupling levers 359 each of which is pivoted at 360 to the extensions of each of said levers 315. Each lever 315 at its extension thereof is provided with a lug 361 adapted if it is elevated to contact with a lug 362 of the coupling lever 359 of the next lower order thereby causing when the lever 315 of the higher order is elevated the elevation of the lever 315 of the next lower order to cause the printing of the necessary "0" in the lower order printing position.

SPLIT CONTROL MECHANISM

The printing mechanism may be split so that each bank of ten printing wheels may be sub-divided into a plurality of independent sub-sets and this is accomplished by providing each of the coupling levers 359 with a manually operated portion 363 which is adapted to be manually rocked at the point of split so as to prevent the coaction of the lugs 361 and 360. This form of split mechanism is well known in the art and for this reason is only generally explained herein.

Summarizing, therefore, the machine is provided with four independently operated and selected sets of item listing mechanisms each of which may be selected under control of the list keys 318 and further each set of printing mechanisms may be sub-divided into independent sub-sets thereof.

RESTORATION OF TYPE GEAR WHEELS TO NORMAL POSITION

With the present understanding of the operation of the machine, it will be observed that the type gear wheels are moved to differential positions so as to take an impression therefrom. It will be obvious that after the printing operation the type gear wheels should be returned to normal positions and this is effected by the second revolution of the shaft 213 which it will be recalled is performed during the time that the rack 197 rotates the pinion 198. During the second revolution of shaft 213 the totalizer gears 191 are demeshed from the operating gears 192 and the card feeding mechanism is not being driven at this time due to the particular construction of the Geneva driving mechanism shown in Figs. 6, 8, and 9.

Attention is directed to the fact that the impulses directed to the magnets 224 to initiate the operation of a totalizer gear 191 are timed to occur after a $\frac{1}{16}$th revolution of the shaft 213 has been effected. This will be clear from Fig. 18 wherein it will be observed that since the clutch tooth 219 is out of engagement with the teeth of ratchet wheel 214 the ratchet wheel 214 will rotate counterclockwise idly through an angle equivalent to one tooth space. Obviously for the entry of a "9" the disk 216 will be rotated nine steps by the first revolution of the shaft 213 so that in the example assumed in order to bring the type carrier to normal or "0" position the disk 216 should be given a movement of one step and this step of movement is effected during the second revolution of shaft 213 as shown in Fig. 27 and at the termination of the one step of movement the arm 220 will be contacted by the clutch pawl 218 (since in the meantime magnet 224 has been deenergized) thereby disengaging the clutch tooth 219 from the ratchet wheel 214 permitting the shaft 213 to rotate the remainder of the revolution or nine steps.

Obviously if a "1" has been entered in a totalizer element and the related type carrier has been positioned to print the digit "1" the shaft 213 during its second revolution will turn the type gear wheel 313 nine steps to bring it to normal position as is shown in Fig. 27 in the "Timing to Add "1"".

Summarizing, during the second revolution of shaft 213 the type gear wheels 313 are turned complementary amounts to bring them to normal positions without, however, affecting the amounts entered in the several totalizers.

LOCKING MECHANISM FOR OPERATING GEARS 192

It is desirable to lock the operating gears 192 to prevent their accidental displacement during certain machine operations and to this end loosely mounted upon the shaft 316 is a bail 370 (Figs. 23 and 24) provided with fingers 371 adapted to engage the interdental spaces of the operating gears 192. A cam 372 (Fig. 24) which is secured to the shaft 18 is adapted through a bell crank 373 and a slidable member 374 connected to one arm of the bail 370 to control the movement of the bail 370 in a manner now to be described.

The cam 372 is provided with a portion 375 which permits the fingers 371 to engage the operating gears during the time that the totalizer gears 191 are meshed with the operating gears 192. The cam portion 376 is adapted through the bell crank 373 and slidable member 374 to rock the fingers out of cooperation with the interdental spaces of the operating gears 192 and maintain this disengagement during the time that the operating gears 192 are being differentially positioned. The cam portion 377 of the cam 372 causes the operating gears 192 to be held by the fingers 371 when the totalizer gears 191 are demeshed from the operating gears 192. The cam portion 378 of the cam 372 is adapted to cause the fingers 371 to be disengaged from the operating gears 192 during the time that the type gear wheels 313 are rotated by the operating gears 192 complemental extents. The timing of cam 372 is shown in Fig. 27 with relation to its operation of bail 371.

PAPER SPACING MECHANISM FOR ITEMS

It is of course necessary to space the printed items as they are successively listed upon the record strip. The paper spacing mechanism provided for the present machine is best disclosed in Figs. 7, 23 and 25 wherein it will be seen that the platen 331 is secured to a shaft 381 to which is attached a pinion 382 in mesh with a gear 383 secured to a shaft 384 and to said gear 383 there is securely attached a ratchet wheel 385. Loosely mounted upon the shaft 384 is a spring urged arm 386 to which is pivoted a spring pressed feeding pawl 387. Loosely mounted upon a rod 388 is an irregular shaped plate 389 and one extension thereof is connected to the arm 386 by means of a pitman 390. A spring 391 attached to the plate 389 causes the plate 389 to be rocked when it is subsequently unlatched so that a roller 392 carried by said plate 389 is constantly urged toward the profile of a cam 393 attached to the shaft 199 and it will be recalled that said shaft is adapted to be rotated a single revolution during each cycle of operation of the machine by the driving means shown in Fig. 3.

Pivotally mounted upon a rod 394 is a manually settable lever 395 which is settable from a position designated as "List" to an alternative position designated "Tab" and in the position shown in Fig. 25 the lever 395 is adapted to cause item spacing operations for the successive listing operations.

The lever 395 has attached thereto a depending arm 396 carrying a pin 397 engageable with an open slot 398 of an arm 399 which is pivoted at 400 to an arm 401.

Referring to Fig. 7 it will be seen that the gear 184 has attached thereto a pin 402 normally coacting with a trip arm 403 loosely pivoted upon a supporting shaft 404 and said trip arm has an integral extension 405 (Fig. 25) normally engaging a shoulder 406 of the arm 399. The pin 402 is so positioned that during the initial rotation of the gear 184 the arm 403 will be rocked by the pin 402 (see timing of 425 in Fig. 27) so that by the engagement of its extension 405 with the arm 399 the arm 401 will be rocked counterclockwise as viewed in Fig. 25 thereby withdrawing a latching extension 407 of the arm 401 out of engagement with a shoulder 408 of an extension of the plate 389 permitting spring 391 to rock the plate 389 slightly.

During the unlatching operation to disengage the latching extension 407 from the shoulder 408 the roller 392 will drop downwardly slightly until it contacts with the cam 393. The timing of cam 393 is shown in Fig. 27. As the cam 393 rotates in a clockwise direction as viewed in Fig. 25 it will permit roller 392 to follow down the inclined cam portion 393a of cam 393 until an extension 409 of the plate 389 engages a shoulder of a hook 410 which at this time is immovable. By the action of the spring 391 the plate 389 will be rocked so that the arm 386 moves the pawl 387 over the ratchet wheel 385 so that said pawl now engages the next lower tooth of the ratchet wheel 385. It is pointed out that in single spacing operations, the roller 392 will not engage the lowermost portion of the cam portion 393a but will be held upwardly by the hook 410 so that the pawl 387 moves downwardly only for a distance of one tooth space. The latching extension 407 due to the clockwise movement of the plate 389 will now engage a recess 411 of the plate 389. Upon continued rotation of the cam 393 in a clockwise direction a cam portion 393b of said cam will now coact with the roller 392 positively rocking the plate 389 and elevating the pitman 390 so that the pawl 387 will turn the ratchet wheel 385 a distance of one tooth space to feed the paper strip surrounding the platen 331. A spring 412 attached to the arm 401 will now be effective to relatch the plate 389 by the engagement of the latching extension 407 with the shoulder 408 of plate 389.

It will be recalled that before the second half of the revolution of the shaft 199 (or the second revolution of shaft 213, Fig. 3) the item printing operation takes place and printing will be effected on a portion of the paper strip which was presented to the printing line by the paper feeding operation just described. It is obvious, therefore, that the paper feeding operation which takes place at the initial operation of say, the second machine cycle will feed the paper strip so as to bring the item printed in the first cycle of operation of the machine away from the printing line so that the item listed in the second cycle of machine operation will be printed upon the next line of the paper strip.

AUTOMATIC GROUP CONTROL MECHANISM

The automatic group control mechanism employed in connection with the present machine is substantially the same as that disclosed in Patent No. 1,976,617 dated October 9, 1934 and is employed in connection with the present machine to determine whether a pair of record cards analyzed concurrently during the same tabulating machine cycle is identical with respect to their classification group designations. The mechanism will now be explained in detail.

A number of double wound relay magnets are provided each having a pick-up winding 418 (Fig. 2) and a holding winding 419. The pick-up windings 418 terminate in plug sockets 420 and 421 by means of which the pick-up windings may be plug connected in series with the control brushes 115 and the adding control brushes 116. Since the index point positions of the card passing the second set of brushes 116 are analyzed concurrently with the analysis of the corresponding index point positions of the following card passing the first set or control brushes 115 perforations occurring in corresponding index point positions of both cards will complete a circuit to the pick-up winding 418 at a time in the cycle of operation of the machine corresponding to the location of the perforation.

*Control pick-up circuit*

In view of the fact that a single double wound relay magnet is provided for each card column the pick-up circuit for only one column will be described, it being assumed that the brushes 115 and 116 locate corresponding perforations in corresponding columns of a pair of records at the same time. This circuit is traceable as follows: from the alternating current line 118 to the roller 169, a control brush 115, plug connection 422 to a plug socket 420, pick-up winding 418, plug socket 421, plug connection 423 to an adding control brush 116, contact roller 170, wire 227, circuit breaker contacts 229, wire 228, relay contacts 139b now closed, to the other alternating current line side 119.

*Control holding circuit*

The control holding circuit for a single order will now be explained.

Energization of the magnet 418 will open its contacts 418a and close its contacts 418b, the latter setting up a holding circuit for the winding 419 which is traceable as follows: from the direct current line side 120, winding 419, relay contacts 418b now closed, a wire 424, contacts F—4 to the other direct current line side 121. The contacts F—4 are closed as shown in the timing diagram during the analysis of the index point positions and are closed until the mechanism has performed its controlling function. It is thus apparent that the windings 419 are energized if there is a similarity in control perforations of a pair of records and that the windings 419 hold all the stick circuits by keeping the contacts 418b closed in all orders which agreement occurred between the cards and retain contacts 418a open in all orders in which agreement occurred between cards.

TOTAL TAKING CONTROL CIRCUIT

The total taking control circuit extends from the direct current line side 120 through a relay magnet 125 and thence to one blade of each of the several sets of contacts 418a, the other blades having the related wiring connections 425 to plug sockets 426 and plug connections 427 are made in accordance with the number of controlling columns and in the present instance the plug connection 427 is shown for two controlling card columns. From the plug connections 427 the circuit extends through auto-control switch 428 now closed, contacts F—2, relay contacts 139a now closed, contacts C—4 to the other direct current line side 121. From the timing diagram it will be seen that contacts F—2 close at the time contacts C—4 are closed so that the contacts F—2 at a predetermined point in the machine cycle will transmit an impulse to the relay magnet 125 provided that one of the relay contacts 418a retain their normal closure due to a dissimilarity in corresponding perforations of a pair of record cards. In the event that one set of the relay contacts 418a is closed due to lack of identity in corresponding perforations in a pair of record cards an impulse will be transmitted to the relay magnet 125. In the event that relay magnet 125 is energized its stick contacts 125c are closed thereby extending the circuit from the relay magnet 125 through the relay contacts 125c, wire 429, contacts T—2 to the other direct current line side 121 and the relay magnet 125 will be held energized due to the continued closure of contacts T—2. The relay magnet 125 is deenergized when contacts T—2 open during the next total taking cycle.

At the time contacts F—2 close to send an impulse to the relay magnet 125 in the event that there is a dissimilarity in perforations an impulse will be transmitted from the alternating current line side 119 by a circuit leading through contacts C—1 which close while contacts T—2 are closed, through the relay contacts 125b now closed because contacts T—2 are closed to keep relay magnet 125 energized, wire 430, the auto-control switch 431 now closed, the total clutch magnet 432 to the other alternating current line side 118 thereby causing the energization of the total clutch magnet 432 and an automatic total taking operation will be effected in a manner now to be explained in detail.

TOTAL TAKING MECHANISM

The one revolution clutch which is controlled by the total clutch magnet 432 is similar in construction and operation to the card feed clutch controlled by the card feed clutch magnet 60 and which was previously described in detail in its construction and operation.

In general, to the tube 29 there is secured a plate 433 (Fig. 26) to which is pivoted a clutch dog or pawl 434 adapted to register with a notch 435 of a disk 436 in each rotation of the plate 433 effected by the tube 29. A roller 437 carried by a clutch control arm 438 is adapted to normally prevent the engagement of the clutch dog with the notch 435 but when the total clutch magnet 432 is energized its armature 442 will be attracted to unlatch the clutch control arm 438 so that the roller 437 will be drawn out of contact with the tail of the clutch dog 434 permitting the latter to be moved by its spring 439 to effect an engagement between the clutch dog 434 and the disk 436.

To the disk 436 there is attached a gear 440 meshing with a gear 441 attached to the aforementioned shaft 186 (see also Fig. 4). The shaft 186 may be herein designated as the total taking shaft and since it is driven by the main drive shaft 18 through the Geneva drive mechanism shown in Figs. 4 and 6 it is obvious that said shaft is driven at its initial operation with an increasing acceleration, then by a uniform rotation and thereafter by a decelerated rotation. This manner of operation is similar to the manner of operation of the card feeding mechanism which at this time is inoperative due to the fact that the card feed clutch 60 has not been energized. The various functions of the total taking shaft 186 will now be explained.

*Means for withdrawing carry segments out of mesh with totalizer pinions*

In view of the fact that the totalizer pinions 191 are rotated in the same direction as in adding operations in order to determine their total representing positions it is obvious that the totalizer pinions 191 must first be disengaged from the carry segments 268 (see Fig. 19). This function is effected at times indicated in Fig. 27 for the timing of cam 443 by means of a cam 443 (see Fig. 20) secured to the shaft 186 which at the initial operation of the shaft 186 is adapted by its coaction with a roller 444 secured to the arm 279 to rock the free end of the arm 279 downwardly and by its engagement with the rod 278 rock the bail 270 so as to move the carry segments 268 (Fig. 19) out of engagement with the totalizer pinions 191 and retain this disengagement during the time that the totalizer pinions are supplementally rotated to determine their total representing positions.

*Means for rotating the totalizer pinions to determine their total representing positions*

This particular means includes the aforementioned shaft 252 which is driven by the total taking shaft 186 through a Geneva drive mechanism shown in Fig. 22.

Referring to Fig. 22 it will be seen that to the shaft 186 there is secured an irregular shaped plate 445 which is in the plane of a plate 446 secured to the shaft 252. At the initial rotation of the plate 445, in a counterclockwise direction, a hump 447 thereof will engage a portion 448 of the plate 446 thereby rocking the shaft 252 initially backwardly or just opposite to the clockwise direction it is subsequently driven.

Referring to Fig. 3, it will be seen that to the shaft 252 there is secured a plurality of gears 449 and while only two are shown in Fig. 3 for the purpose of clarity in the drawings, a gear 449 is provided for each totalizer frame (see Fig. 20) and each is adapted to mesh with a gear 450 carried by the related totalizer frame and each gear 450 is secured to the aforementioned shaft 180. Each gear 450 during adding operations is moved by the elevation of the totalizer frame into mesh with an aligning segment 481 fixed to the tube 482 but for total taking operations the gear 450 is not in engagement with a related segment 481 due to the normal position of the totalizer frame. Obviously the shafts 180 and 252 are normally locked against rotation by the Geneva lock so that shaft 180 is non-rotatable for unit carry operations, as previously described. Through the gears 449 and 450 the shaft 180 is initially rocked as viewed in Figs. 16 and 19 in a clockwise direction thereby rocking the ratchet wheels 277 carried thereby and causing the clutch tooth 276 of a particular pawl 273 to be rocked by its spring 274 if it rests on a high part of the ratchet wheel tooth so that its clutch tooth 276 will drop to engage a notch of the ratchet wheel 277. This particular operation has been found to be most desirable in insuring that the clutch pawls 273 positively engage the teeth of the ratchet wheels 277 prior to the resetting of the totalizer pinions 191 if they are not in proper clutching relationship.

Thereafter as the plate 447 is rotated counter-clockwise (Fig. 22) the teeth of a mutilated gear 452 secured to the shaft 186 will engage the teeth of a mutilated pinion 453 secured to the shaft 252 so that the gear 452 in its rotation will drive the pinion 453, shaft 252 and shaft 180 thereafter with a uniform rotation.

Referring to Fig. 19 it will be recalled that the shaft 180 carries the series of ratchet wheels 277 for the related totalizer so that as the shaft 180 is rotated counterclockwise each ratchet wheel 277 in cooperation with the clutch tooth 276 of the associated pawl 273 will rotate the disk 241 and the related totalizer pinion 191 secured thereto.

When each totalizer pinion 191 comes to its zero position an extension 454 of the clutch pawl 273 will contact with a bail 455 (Fig. 16) positively rocking the clutch pawl 273 about its pivotal point 273a and disengaging it from the ratchet wheel 277 and at this time a totalizer pinion 191 has been rotated an amount complementary to ten to bring it to its zero position.

The bail 455 is normally out of cooperation with the extensions 454 of the clutch pawls 273 and the cooperative correlation between these elements for a totalizer is effected under control of a related "Grand total" key 456 (Fig. 23). As best shown in Fig. 1 a grand total key is provided for each of the several totalizers and the construction and mechanism controlled by each of the grand total keys 456 is similar for all the keys and will be described in connection with only one key.

Referring particularly to Figs. 15 and 23 it will be seen that the grand total key in construction and operation is similar to that described hereinbefore in connection with the "List" key 318 and each key 456 is adapted when rocked to bring an interposer 457 into cooperation with a total bail 458 so that when the latter is rocked by means to be subsequently explained, it will move the interposer 457 and rock an arm 459 in a clockwise direction as viewed in Fig. 23. The arm 459 for each totalizer has a pin and slot connection 460 to a related link 461 which is slidable on the shaft 252 and which has a forked extension 462 engageable with a rod 463 of a yoke shaped frame. The link 461 is provided with a notch engaging a lug 464 of an arm 465 pivoted on a rod 466 and said arm 465 has an upward extension engaging with a side arm of the bail 455.

From Fig. 22 it will be seen that to the shaft 186 there is secured a disk 467 having a cam notch 468 cooperating with an arm 469 loosely mounted on the shaft 178 but attached to the aforementioned bail 458. The timing of the operation of bail 458 is indicated in Fig. 27 in the timing for cam disk 467.

The grand total keys 456 for each of the various totalizers are depressed prior to listing operations so that upon a total taking operation the initial rotation of shaft 186 will rock the arm 469 and the total bail 458 thereby causing through the interposer 457 (Fig. 23) arm 459 to be rocked. This will cause the link 461 to be moved to the left as viewed in Fig. 23 rocking the arm 465 clockwise and moving the bail 455 to the right so that it will be engaged by the extensions 454 (Fig. 19) of the clutch pawls as the totalizer pinions 191 come to their zero positions. It is obvious that the formation of the disk 467 (Fig. 22) is such so as to retain the bail 455 (Fig. 23) in its rocked position during the resetting of the totalizer pinions to zero as indicated in the timing diagram for shaft 186 (see Fig. 27).

*Means for printing the totals standing on the totalizers*

From Fig. 23 it will be apparent that when the link 461 is moved to the left by the means previously described by its connection to the rod 463 it will move a yoke of which a bar 470 constitutes a cross member. Connected at 471 to the clutch control arms 220 (Fig. 16) is a plurality of interposers 472 adapted when the yoke is rocked to be moved by the rod 470 into cooperation with the arms 244 (see Fig. 16) of the carry mechanism and such cooperation is maintained during the time that the totalizer pinions 191 are restored to zero.

Attention is directed to the fact that the shaft 213 at this time is uniformly rotating and in synchronism with the uniform rotation imparted to the shaft 180. The result of this is that when a totalizer element passes through zero the carry over tooth 242 (Fig. 19) of its disk 241 will contact with the projection 243 of the arm 244 thereby rocking it and shifting the related interposer 472 to the right. By means of the pivotal connection 471 to the lower extension of the clutch control arms 220 it will be obvious that such arms will be rocked just as if they were rocked by the energization of the clutch control magnets 224 thereby causing in the manner previously described the gear 215 (Fig. 18) to be clutched to the shaft 213 at a point in the machine cycle varying with the extent of operation given to the totalizer gear to restore it to zero. For example, if a totalizer pinion should be in such position that it represented the digit "3" obviously it will be rotated seven steps to bring it to zero and in coming to such a position it will rock the clutch control arm 220 to engage the clutch so that subsequent rotation of the operating gear 192 through the gear 215 will rotate the printing gear wheel 313 (Fig. 16) three steps to bring the "3" printing character to the printing line. The times in the cycle of machine operation that the clutches are engaged by the passage of the totalizer wheels through zero corresponds to the times in the cycle that the index points of a card are analyzed if an item entering operation was to be effected. In this manner, the several sets of printing gear wheels 313 are rotated to represent the totals standing upon the various totalizers and the rotation of the type gear wheels 313 occurs after the totalizer gears 191 are restored to zero.

In order to effect a total printing impression each grand total key 456 (Fig. 23) is adapted by means of its related arm 459 and an extension 473 thereof to rock the bail 341 thereby causing a printing impression from the type gear wheels 313 in the manner previously described in connection with item listing operations.

After the type gear wheels 313 have been diffentially set and a printing impression is taken therefrom the type gear wheels are returned to zero and this is effected by the second revolution given to the shaft 213 (Fig. 18) and the resetting of the type gear wheels 313 to normal for total printing operations is effected in the same manner previously described for listing operations and will, therefore, not be repeated.

In the event that a totalizer gear 191 is already at zero it is obvious that when the bail 455 (Fig. 16) is rocked, the extension 454 of the clutch pawl 273 related to the gear which is at zero will be immediately rocked by the movement of the bail 455 to thereby disengage the clutch connection. In such instance, the totalizer gear which is at zero will not be rotated and printing will be effected from the related type gear wheel 313 to print "0" since it will remain in its normal position.

The zero elimination mechanism and zero insertion mechanism will operate in total printing operations in substantially the manner previously described in connection with item listing operations and its operation will not be repeated.

PAPER SPACING MECHANISM FOR TOTALS

It is necessary, of course, to feed the paper strip in order to provide a blank line to receive the printed total so as to space the item last printed from the following total printed in the blank line. It is further desirable to separate the total printed from the first item of the next group by means of a single blank line.

The mechanism for accomplishing these functions is best shown in Figs. 7 and 25 wherein it will be seen in Fig. 7 that a pin 475 secured to the gear 440 is adapted to rock an arm 476 secured to a sleeve 477 during the initial operation of the machine at a point in the cycle shown in Fig. 27 for the timing of pin 475. While the arm 476 is shown cut away in Fig. 25 to show a part of the arm 403, the arm 476 is long enough, as shown in Fig. 7, to be engaged by the pin 475. The arm 405 and the sleeve 477 are secured together so that by means of the arm 399 the arm 401 will be rocked just as if it was rocked by the arm 403 to unlatch the plate 389 in the manner previously described. Thereupon roller 392 will drop slightly to unlatch 407 and 408 and then to a distance of one step on the descending part of the cam portion 393a so that upon the further rotation of the cam 393 the cam portion 393b will elevate the pitman 390 and rotate the platen an extent of one step to present a blank line of the paper strip to the printing elements to receive the printed total. This will cause the separation of the total to be printed from the last item of the related group. After shaft 199 has turned a half revolution and at a time indicated in Fig. 27 for the timing of pin 479 a pin 479 secured to the disk 436 will rock an arm 480 attached to the shaft 404. The arm 401 previously described is secured to the shaft 404 by a pin 481 (Fig. 7) so that the pin 479 in rocking the arm 480 will rock the arm 401 so as to unlatch the plate 389 and permit it to drop a short distance. Shaft 199 is now at rest and at this time total printing is effected. Thereafter shaft 199 resumes its rotation and roller 392 is now in cooperation with a descending portion 393c of the cam 393 thereby permitting the pitman 390 to drop an extent of one step.

The cam portion 393d of the cam 393 will by its contact with the roller 392 elevate the pitman 390 and feed the paper strip to the extent of one line. Assuming that a series of items pertaining to the next group is to be printed, it will be obvious that during the first item listing operation the pin 402 will be effective by the mechanism described in the section "Paper spacing mechanism for items" to feed the paper the extent of one line which will receive the first printed item. This will cause the total printed to be spaced from the first item of the next group by one blank line thereby causing the printing of items and totals to be grouped together but separated from the items and a related total pertaining to the next group by a blank line.

SUB-TOTAL PRINTING MECHANISM

It is desirable at times to be able to print totals without clearing the totalizers and in the event that several series of items are successively printed obviously such totals will constitute progressive totals. For one series of items the total printed will constitute, as is well known in the art, a sub-total. To this end for each totalizer there is provided a sub-total key 484 (Figs. 1 and 5) and which is depressed prior to an operation of the machine so as to selectively cause the printing of the total of the related totalizer without resetting it to zero.

The sub-total keys 484 are constructed similar to the list 318 and grand-total keys 456 so that when depressed they may be locked in depressed position until subsequently released by a manual operation. As best shown in Figs. 15 and 23 each sub-total key 484 is provided with a laterally extending integral portion 485 adapted to extend over the grand total key 456 pertaining to the same totalizer so that when the sub-total key 484 is depressed it will cause the automatic depression of the grand total key 456 which, as previously described, operates mechanism to cause total printing operations from the selected totalizer.

As best shown in Fig. 23 each sub-total key 484 differs in its construction from the grand total key 456 and list key 318 in that it is provided with an integral extension 486 adapted to co-operate with an extension 487 of the link 461 of the related totalizer. The depression of the sub-total key will through the extension 486 rock the link 461 disengaging the lug 464 of the arm 465 from the notch in the link so that when the total bail 458 is subsequently rocked it will move the link 461 to the left as previously described by means of the arm 459 without, however, rocking the arm 465 and bail 455 of the associated totalizer. Since the bail 455 will remain in its normal position, obviously the totalizer gears 191 of the associated totalizer will be permitted to pass through the zero positions and also return to their previous total representing positions thereby reentering the total in the totalizer.

During the time that the totalizer pinions 191 are passing through zero the interposers 472 will nevertheless be operated at differential times in the manner previously described so as to cause the printing gear wheels 313 to be set to differential positions. This will cause the printing of the totals from the totalizers without, however, requiring the totalizers to be reset to zero.

DOUBLE SPACING CONTROLLING MECHANISM

The tabulating machine is preferably provided with a means for doubling the extent of line spacing operations so as to cause adjacent items to be separated by a blank line and also to cause the total to be separated from the last printed item of the related group by a blank line. This spacing mechanism when effective is adapted to cause the total to be spaced from the first item of the next group by three blank lines.

To this end the hook 410 (Fig. 25) is an integral part of an arm 490 which is loosely pivoted upon the rod 404 and may be manually positioned from the position designated as "Single space" to the position designated as "Double space" and when manually moved to such a position the hook 410 is removed from the extension 409 of the plate 389.

Considering item spacing operations it is evident that in view of the disengagement of the hook 410 from the extension 409 that during the initial rotation of the cam 393 the roller 392 will drop to the lowest portion of the descending cam portion 393a permitting the pawl 387 to idly move over the ratchet wheel 385 a distance of two teeth. It will be recalled that the timing of cam 393 is shown in Fig. 27. Thereupon a cam portion 393f will elevate the pitman 390 a distance of one step and the cam portion 393b will subsequently move the pitman 390 another step thus causing two paper feeding operations for each item printing operation which causes adjacent items to be separated by one blank line.

In the total printing operations the cam portions 393f and 393b will both be effective, as previously stated, so as to first feed the paper strip a distance of two steps. After the cam 393 has been rotated a half revolution the pin 479 will then be effective to unlatch the plate 389 permitting the roller 392 to descend to the lowest portion of the cam portion 393c after which the total is printed while shaft 199 is stationary. After the total has been printed shaft 199 is again rotated so that the cam portion 393g will be effective to permit roller 392 to drop downwardly to lower the pitman 390 for a distance of another step. While the roller 392 has now descended two steps one before total printing and the other after total printing no paper feed has occurred. The cam portion 393h will be effective to elevate the pitman 390 one step and then the cam portion 393d will be effective to elevate the pitman 390 another step thereby causing a paper feeding operation of two spaces after a total printing operation. Obviously during the succeeding item printing operation for the first item of the next group during the first half of the revolution of the cam 393 the paper will be fed a distance of two more steps thereby separating the total printed from the first item pertaining to the next group by three blank lines since the first item of the next group is printed in the space provided by the last step of the four paper spacing operations.

TABULATING OPERATIONS

The present machine is provided with controlling mechanism which is adapted to automatically effect tabulating operations under control of successive cards, excluding item printing under control of these cards, and to cause automatically total printing operations from the selected totalizers and as an incident thereto a paper feeding operation.

Prior to an operation of the machine to effect tabulating operations which are herein considered as non-listing operations the lever 395 (Fig. 25) is shifted from the "List" position to the "Tab" position and the grand total keys 456 and sub-total keys 484 are selectively depressed in accordance with whether the total printing operations from the selected totalizers are to be effected as grand total taking operations or sub-total taking operations. The list keys 318 for the several totalizers are not depressed so as to automatically exclude the printing of items.

Shifting of the lever 395 to the "Tab" position will automatically exclude paper feeding operations by reason of the fact that rocking of the lever 395 about its pivot 394 will rock the arm 396 and through the pin 397 engaging the open slot 398 in the arm 399 will rock the latter clockwise as viewed in Fig. 25 disengaging the hook 406 from the arm 405.

In view of this disengagement it will be obvious that the rocking of the arm 403 by the pin 402 (Fig. 7) in item entering operations or the rocking of the arm 476 by the pin 475 in total printing operations will not cause the arm 401 to be rocked in view of the shifted position of the arm 399. However, in total printing operations, the pin 479 (Fig. 7) will rock the arm 480 at a time indicated in Fig. 27 for the timing of pin 479, the shaft 404 and the arm 401 which is secured to the shaft 404 thereby unlatching the plate 389 so that in the manner previously described a paper feeding operation will be effected after the total is printed. This will cause the successive totals to be printed one after the other and separating them without any intervening blank line if the lever 490 is set to "Single space." If the lever 490 is set to the "Double space" position the adjacent totals will be separated by a blank line.

AUTOMATIC STOPPING OF MACHINE OR RESTART OF CARD FEED MECHANISM FOR ITEM ENTERING OPERATIONS UNDER CONTROL OF THE NEXT GROUP OF CARDS

Referring to the wiring diagram it will be seen that the stick circuit 429 for the relay magnet 125 which causes the closure of relay contacts 125b to effect automatically a total taking operation is maintained through the relay contacts 125c and contacts T—2. The opening and closure of the two T contacts is controlled by the following means.

From Fig. 5 it will be seen that to the shaft 186 there is secured a gear 491 meshing with a gear 492 secured to a shaft 493 to which is secured the differently formed commutators controlling the two T contacts. The construction of the T contacts and controlling commutators is similar to the construction described in connection with the C contacts and will, therefore, not be repeated.

When contacts T—2 (Fig. 2) open during the total taking cycle relay magnet 125 will become deenergized thereby causing the relay contacts 125b to open and relay contacts 125a to close. Automatic restarting of the card feed will be effected by a circuit now extending from the line side 119 to contacts C—1 closed during the cycle to complete the card feed clutch circuit through relay contacts 125a, card lever relay contacts 140a, automatic start switch 494, contacts T—1 closed while contacts C—1 are closed, stop key contacts 124, contacts 123, and card feed clutch magnet 60 to the other line side 118.

Obviously, if the last card of the group is analyzed it will ultimately pass by the card lever 134 (Fig. 13) to open contacts 138 thereby causing the card lever relay magnet 140 to be deenergized, thus causing relay contacts 140a to open and preventing an impulse from being transmitted to the card feed clutch magnet 60 by the contacts F—1. Hence, item entering operations are automatically terminated after the last card of a group has controlled the machine.

MANUALLY CONTROLLED TOTAL TAKING OPERATIONS

To manually initiate sub or grand total taking operations for a selected totalizer in accordance with the depression of key 484 or 456, respectively, the machine is provided with a manual total key 495 (Figs. 1, 2 and 26) which when depressed closes two sets of contacts 496 and 497. The former completes a circuit through normally closed relay contacts 498a to the relay magnet 125 when contacts C—2 close causing relay magnet 125 to be energized and relay contacts 125b to close. When contacts C—1 close a circuit is made from the line side 119, through contacts C—1, relay contacts 125b, contacts 497 closed by the total key 495, total clutch magnet 432 to the other line side 118. This will cause the total clutch to be energized and a total taking operation will ensue, and in the manner previously described in the section "Total taking mechanism."

INTERLOCK BETWEEN AUTO GROUP CONTROL CIRCUIT AND MANUALLY CLOSED TOTAL TAKING CIRCUIT

From Fig. 2 it will be seen that during item entering operations card feed contacts F—4 close to cause a relay magnet 498 to be energized to open its relay contacts 498a thereby opening the circuit for relay magnet 125 through the relay contacts 498a, manually closed total taking contacts 496, and contacts C—2. Hence the total key 495 is locked out of operation during item entering operations to prevent improper machine operations.

INTERLOCK BETWEEN CARD FEED CLUTCH AND TOTAL CLUTCH

From Figs. 7 and 12 it will be seen that arm 58 of the card feed clutch has an extension 501a fitting in a notch of an arm 502 pivoted at 503. The arm 438 for the total clutch, which is similar to the arm 58 of the card feed clutch, has a like extension 504 (Fig. 26) fitting in a notch of an arm 505 pivoted at 506. The arms 502 and 504 have arcuate coacting portions, the portion 507 coacting with the portion 508 when arm 438 is unlatched to thereby prevent a release of the total clutch by a false electrical impulse transmitted to the total clutch magnet 432 while the card feed clutch is operative. In a similar manner the portion 509 coacts with the portion 510 to lock out the card feed clutch from operation by a false electrical impulse transmitted to the card feed clutch magnet 60 when the total clutch is operative.

LAST CARD CONTROL

In Fig. 2 there is shown a special brush 499 coacting with the edge of a card and which in the absence of the last card of the last group beneath the first set of brushes 115 makes contact with the roller 169 and causes the energization of a relay magnet 500, the circuit leading from the line side 118 through roller 169, brush 499, relay magnet 500, switch 501 now closed, through contacts F—3, interrupter contacts 229, wire 228, card lever controlled contacts 139b now closed, to the line side 119. The energization of the relay magnet 500 will also cause the closure of relay contacts 125b just as if relay magnet 125 was energized to thereby initiate automatically a total taking operation after the last card of the last group has controlled the machine by means of the adding control brushes 116. Switch 501 will be closed during group control operations only.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, the combination with a totalizer comprising amount receiving elements, of a frame carrying said elements and movable from a normal position to permit said elements to receive items, movable actuating means engageable with said totalizer elements when the frame is moved from its normal position, printing elements set by said actuating means, means for rotating said totalizer elements to zero positions when the frame is in a normal position, means for moving said actuating means, and means under control of said totalizer elements and rendered effective by the zero positions of said totalizer elements for determining the movement of said actuating means by said moving means to cause the actuating means to set said printing elements from normal positions to represent the amount on said totalizer elements.

2. In a machine of the class described, the combination with a totalizer comprising amount receiving elements, of a frame carrying said elements and movable from a normal position to permit said elements to receive items, movable actuating means engageable with said totalizer elements when the frame is moved from its normal position, printing elements set by said actuating means, means for rotating said totalizer elements to zero positions when the frame is in a normal position, means for moving said actuating means, and means under control of said totalizer elements and rendered effective by the zero positions of said totalizer elements for determining the extent of movement of said actuating means by said moving means to cause the actuating means to set said printing elements from normal positions to represent the amount on said totalizer elements, said moving means thereafter moving said actuating means to set said printing elements to normal positions from amount representing positions.

3. In a machine of the class described, the combination of actuating means, totalizer elements movable from a normal position to engage said actuating means to receive items, printing elements set by said actuating means, a turn-to-zero shaft and means driven thereby for rotating said totalizer elements to zero, means for moving said actuating means, means for driving said turn-to-to-zero shaft for rotating said totalizer elements to zero when said totalizer elements are at said normal positions, and means controlled by the totalizer elements upon reaching their zero positions for determining the extent of movement of said actuating means by said moving means, said moving means thereafter in the same machine operation moving said actuating means to set said printing elements to normal positions 4. In a machine of the class described, in combination, a totalizer including rotatable amount receiving elements, actuating means for differentially rotating the amount receiving elements in one direction in an amount entering operation, actuating means separate and distinct from said first named actuating means for rotating said elements in the same directions to zero positions, means for effecting an engagement between said first named actuating means and said elements for said amount entering operations and for effecting a disengagement between said first named actuating means and said elements at the termination of said amount entering operations, to enable said elements to be rotated by said separate actuating means to zero positions, printing elements rotated by said first named actuating means, and means controlled by the amount receiving elements upon reaching their zero positions for determining the extent of rotation of the printing elements to set the latter to total representing positions.

5. In a machine of the class described having printing elements, in combination, totalizer elements, actuating means for said printing elements and also engageable with the totalizer elements for effecting amount entering operations therein, means separate and distinct from said first named actuating means for rotating said totalizer elements to zero positions, means controlled by the totalizer elements upon reaching their zero positions for determining the extent of movement of said actuating means to set said printing elements to total printing positions, means for effecting a printing impression from said total printing elements when the latter represent a total, and means for thereafter moving said actuating means for rotating said total printing elements to normal positions.

6. In a calculating machine, a totalizer including positionable value receiving elements, a shaft on which said elements are loosely mounted, actuating means for said elements, a plurality of ratchet wheels secured to the shaft, a clutch pawl carried by each element cooperating with a related ratchet wheel and ratcheting over the ratchet wheel as the element is positioned by the actuating means in a value receiving operation, means to effect an engagement between said elements and said actuating means during a value receiving operation and to effect a disengagement between said elements and said actuating means at the termination of the value receiving operation so that in a total taking operation said elements and said actuating means are disengaged, means for driving said shaft to cause the ratchet wheels in engagement with said pawls to rotate the elements to zero positions in a total taking operation and means controlled by totalizer elements upon reaching their zero positions for effecting the movement of the actuating means and for determining the extent of movement of the actuating means in the total taking operation 7. In a machine of the class described provided with totalizer and printing elements, the combination with a uni-directionally rotatable common actuating means for said totalizer and printing elements, of entry controlling means for determining the differential extent of rotation of the common actuating means, a driving means for rotating said common actuating means uni-directionally and means comprising selectively operable clutches controlled by said entry controlling means for determining in an entry operation the extent of differential rotation of said common actuating means, said driving means in the same entry operation effecting a further rotation of said common actuating means after the latter have been differentially rotated to effect through said clutches the positioning of said printing elements to tens complementary extents.

8. In a machine of the class described having a totalizer, the combination of a uni-directionally rotatable actuating means for operating said totalizer, entry controlling means for determining the differential extent of rotation of said actuating means from a rest position, a driving means for rotating said actuating means uni-directionally, selectively operated clutches intermediate said actuating means and said driving means and including devices to retain the clutches in engagement when the engagement has been initiated, during the differential rotation of the actuating means, and also during a further rotation of the actuating means to extents complementary to their differential rotations, means for causing under control of said entry controlling means the initiation of the engagement of said clutches at differential times, to effect the engagement between said driving means and said actuating means at corresponding differential times for causing said actuating means to differentially operate the elements of the totalizer, and means to effect an engagement between the totalizer and said actuating means before the differential rotation of the latter and to disengage said totalizer from the actuating means at the termination of the differential rotation, said driving means effecting through the engaged clutches when the totalizer is disengaged from said actuating means the further rotation of the actuating means to extents complementary to their differential rotations.

9. In a machine of the class described having two sets of elements, the combination with a uni-directionally rotatable common actuating means engaging said sets of elements for operating the latter, one of said sets of elements being disengageable therefrom, of entry controlling means for determining the differential extents of rotation of said common actuating means, driving means for rotating said actuating means uni-directionally and to a constant extent for each machine operation, selectively operated coupling means intermediate said actuating means and said driving means and including devices to retain the coupling means in engagement during the differential rotation of the actuating means and also during a further rotation of the actuating means, and means for causing said coupling means under control of said entry controlling means to effect at differential times the engagement between said driving means and said actuating means for causing the differential extent rotation of said common actuating means to differentially operate said sets of elements, said driving means, in the same operation of the machine the actuating means are differentially rotated and after one of said sets of elements has been disengaged from the actuating means, effecting through the engaged coupling means a further rotation of the actuating means to positively restore the other set of elements.

FREDERICK L. FULLER.
GEORGE FRANCIS DALY.